(12) United States Patent
Kawasaki et al.

(10) Patent No.: US 8,591,360 B2
(45) Date of Patent: Nov. 26, 2013

(54) VEHICLE POWER TRANSMISSION DEVICE AND CONTROL SYSTEM FOR POWER TRANSMISSION

(75) Inventors: Koji Kawasaki, Anjo (JP); Takenori Matsue, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 336 days.

(21) Appl. No.: 12/947,142

(22) Filed: Nov. 16, 2010

(65) Prior Publication Data

US 2011/0118075 A1 May 19, 2011

(30) Foreign Application Priority Data

Nov. 16, 2009 (JP) .................................. 2009-261386

(51) Int. Cl.
*F16H 3/72* (2006.01)
*F16H 37/06* (2006.01)
*F16H 37/02* (2006.01)

(52) U.S. Cl.
USPC .............................................. 475/5; 475/210

(58) Field of Classification Search
USPC ..................................................... 475/5, 210
See application file for complete search history.

(56) References Cited

U.S. PATENT DOCUMENTS

| | | | | |
|---|---|---|---|---|
| 7,347,800 B2 * | 3/2008 | Jackson | ........................ | 475/210 |
| 7,422,535 B2 * | 9/2008 | Raghavan et al. | ................. | 475/5 |
| 7,572,201 B2 * | 8/2009 | Supina et al. | ..................... | 475/5 |
| 7,717,817 B2 * | 5/2010 | Raghavan et al. | ................. | 475/5 |
| 2009/0157269 A1 * | 6/2009 | Matsubara et al. | ............. | 701/54 |
| 2010/0120579 A1 * | 5/2010 | Kawasaki | .......................... | 477/3 |
| 2010/0273605 A1 * | 10/2010 | Kawasaki et al. | ............... | 477/3 |
| 2011/0028260 A1 * | 2/2011 | Kawasaki et al. | ............. | 475/220 |
| 2011/0118077 A1 * | 5/2011 | Kawasaki et al. | ................. | 477/3 |
| 2012/0028749 A1 * | 2/2012 | Kawasaki et al. | ............. | 475/211 |
| 2012/0309584 A1 * | 12/2012 | Matsue et al. | ..................... | 477/3 |

FOREIGN PATENT DOCUMENTS

| | | |
|---|---|---|
| CN | 101004204 A | 7/2007 |
| JP | P2005-48940 A | 2/2005 |
| JP | 2006-308039 | 11/2006 |
| JP | P2009-190455 A | 8/2009 |

OTHER PUBLICATIONS

Japanese Office Action dated Dec. 13, 2011, issued in corresponding Japanese Application No. 2009-261386 with English Translation.
Office Action (11 pgs.) issued Feb. 22, 2013 in corresponding Chinese Application No. 201010551295.3 with an at least partial English-language translation thereof (13 pgs.).

\* cited by examiner

*Primary Examiner* — David D Le
*Assistant Examiner* — Colby M Hansen
(74) *Attorney, Agent, or Firm* — Nixon & Vanderhye P.C.

(57) ABSTRACT

A power transmission apparatus for a vehicle which includes a first and a second planetary gear set to transmit power to a driven wheel. A ring gear of the first planetary gear set is coupled to the driven wheel. A carrier of the first planetary gear set is coupled to a ring gear of the second planetary gear set. A carrier and a sun gear of the second planetary gear set are so linked as to have signs of power which are opposite each other. A sign of speed of the ring gear of the second planetary gear set is reversed under the condition that the a sign of speed of a motor-generator is fixed, thereby reversing the sign of speed of the carrier of the first planetary gear set, which eliminate the circulation of power between the sun gear and the carrier of the first planetary gear set.

18 Claims, 16 Drawing Sheets

FIG.2(a)
GEARED NEUTRAL IN 1ST OPERATION MODE
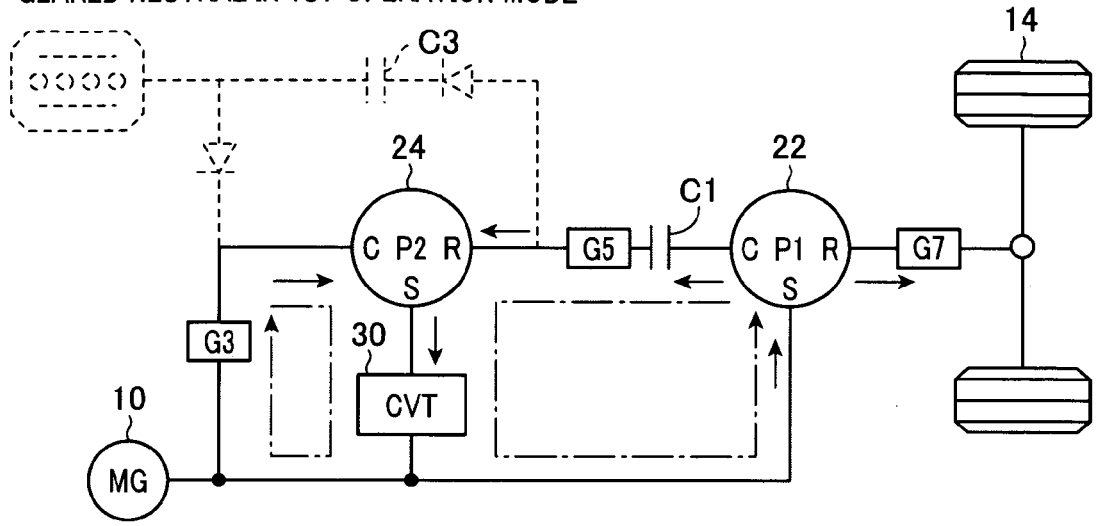
FIG.2(b)
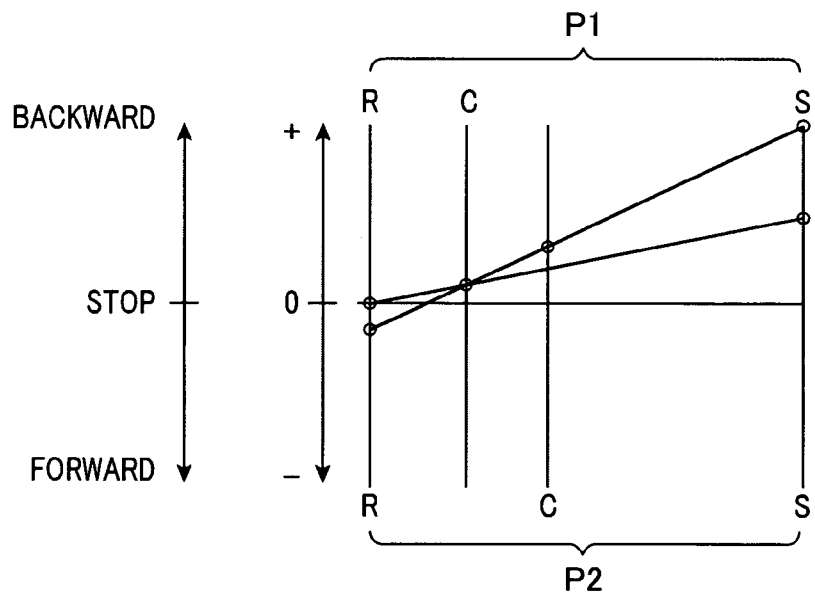
FIG.2(c)
| ROTATIONAL DIRECTION | | | TORQUE | | | POWER | | |
|---|---|---|---|---|---|---|---|---|
| S | C | R | S | C | R | S | C | R |
| + | + | − | − | + | − | − | + | + |
| + | + | + | + | − | + | − | + | + |
P1

FIG.3(a)
P1 POWER SPLIT MODE IN 1ST OPERATION MODE
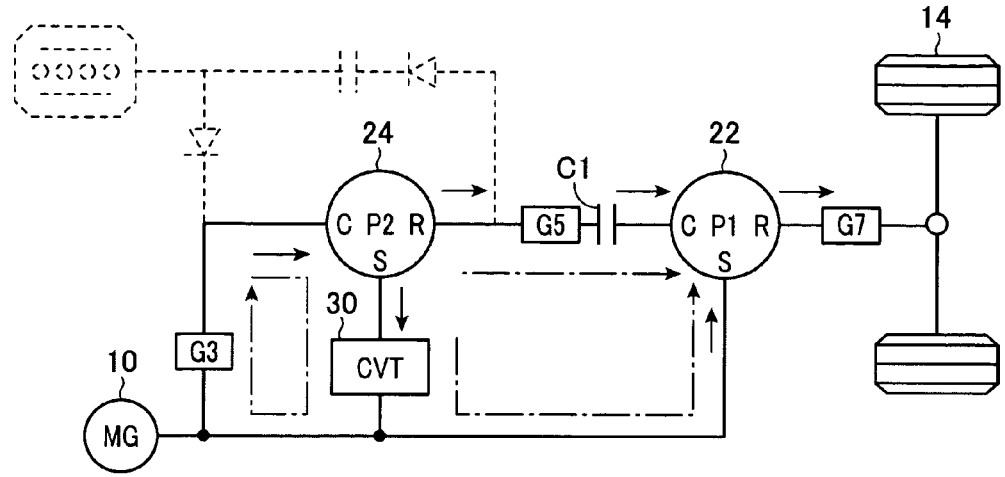
FIG.3(b)
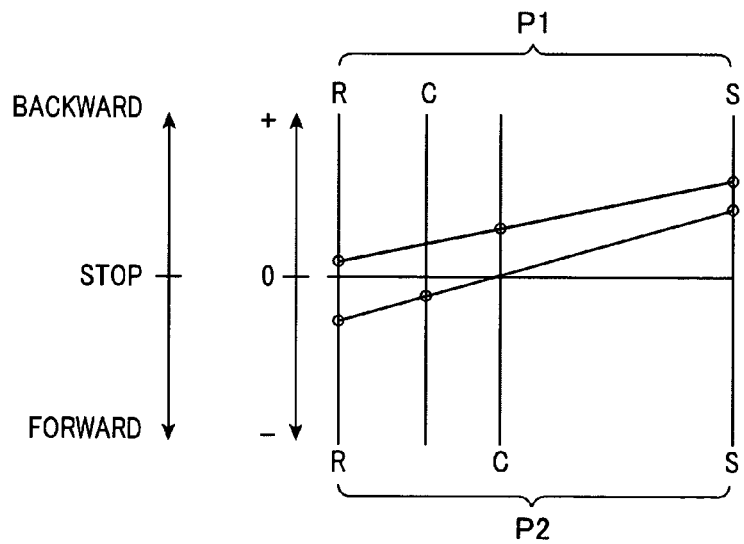
FIG.3(c)
| | ROTATIONAL DIRECTION | | | TORQUE | | | POWER | | |
|---|---|---|---|---|---|---|---|---|---|
| | S | C | R | S | C | R | S | C | R |
| P1 | + | − | − | − | + | − | − | − | + |
| P2 | + | + | + | + | − | + | + | − | + |

1ST OPERATION MODE

FIG.6(a)
ENGINE START IN 2ND OPERATION MODE
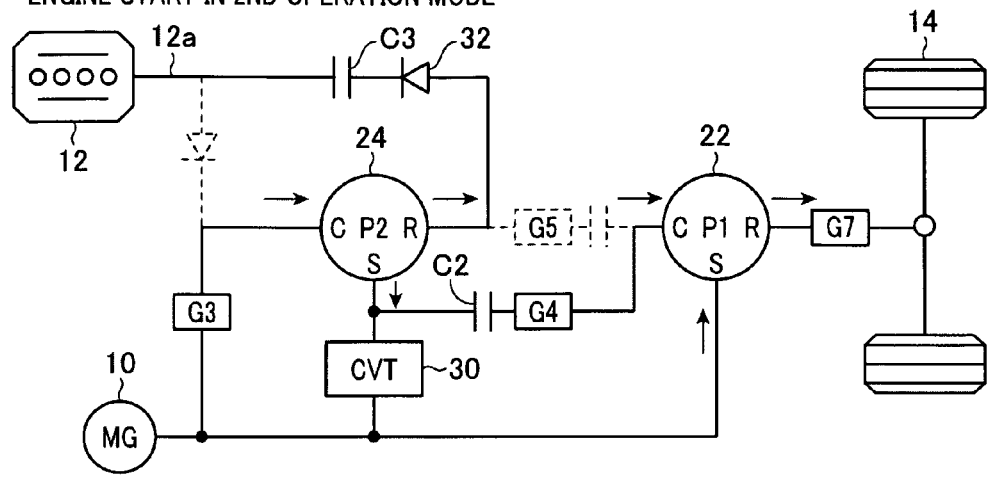
FIG.6(b)
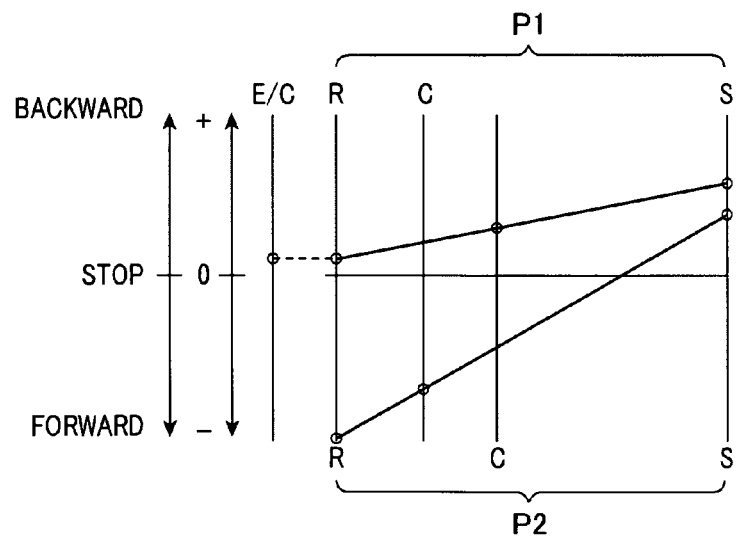
FIG.6(c)
| P2 ROTATIONAL DIRECTION | | | TORQUE | | | POWER | | |
|---|---|---|---|---|---|---|---|---|
| S | C | R | S | C | R | S | C | R |
| + | + | + | + | − | + | + | − | + |

ENGINE POWERED RUNNING IN 2ND OPERATION MODE n = 1~7
wGna, wGnb : wR1, wR2, wS1, wS2, wC1, wC2 : SPEED
rn = (wGnb) / (wGna)
ρ1, ρ2 = (TEETH OF SUNGEAR) / (TEETH OF RING GEAR)
ρ1wS1 − (1 + ρ1) wC1 + wR1 = 0
ρ2wS2 − (1 + ρ2) wC2 + wR2 = 0

VEHICLE POWER TRANSMISSION DEVICE AND CONTROL SYSTEM FOR POWER TRANSMISSION

CROSS REFERENCE TO RELATED DOCUMENT

The present application claims the benefits of Japanese Patent Application No. 2009-261386 filed on Nov. 16, 2009, the disclosure of which is incorporated herein by reference.

BACKGROUND OF THE INVENTION

1. Technical Field of the Invention

The present invention relates generally to a power transmission device for a vehicle which is equipped with a plurality of power split rotors which work to split an output power or torque between a power source such as an electric rotating machine (e.g., a dynamo-electric machine) or an internal combustion engine and a driven wheel of the vehicle and are designed to rotate in conjunction with each other and a power transmission control system for such a power transmission device.

2. Background Art

Japanese Patent First Publication No. 2006-308039 discloses a power transmission device to be installed in an automotive vehicle. The power transmission device is equipped with a first and a second planetary gear set and a continuously variable transmission (CVT). The power transmission device also includes a low-speed clutch and a high-speed clutch which alter mechanical connections between the first and second planetary gear sets. When the vehicle is running at low speeds, the low-speed clutch is engaged, while the high-speed clutch is disengaged to establish a geared neutral which typically enables the speed of an output shaft of a planetary gear set to be brought to zero (0) while an input shaft is rotating. The geared neutral is achieved under the condition that two of rotors of the planetary gear set other than one connected mechanically to the output shaft are opposite in sign of power to each other. However, such a condition will result in circulation of power between the two of the rotors, thus resulting in a decrease in efficiency of use of rotational energy in the power transmission device. When the vehicle is running at high speeds, the low-speed clutch is disengaged, while the high-speed clutch is engaged to decrease the magnitude of torque exerted on the CVT below that exerted on the input shaft, thereby improving the efficiency of transmission of power in the CVT.

The above structure of the power transmission device, however, needs to switch the operation states of the high- and low-speed clutches in order to change a power circulation mode in which the circulation of power occurs and a non power circulation mode in which the circulation of power does not occur.

SUMMARY OF THE INVENTION

It is, therefore, a principal object of the invention to avoid the disadvantages of the prior art.

It is another object of the invention to provide a power transmission apparatus for a vehicle which is equipped with a plurality of power split rotors to control transmission of rotational energy from a power source to a driven wheel of the vehicle and designed to switch between a power circulation mode in which power is circulated between two of the power split rotors and a non power circulation mode in which the power is not circulated between the two of the power split rotors without use of a clutch mechanism.

According to one aspect of the invention, there is provided a power transmission apparatus for an automotive vehicle. The power transmission apparatus comprises: (a) a first rotor set including a first, a second, and a third rotor which are so linked mechanically as to have rotational speeds thereof arrayed on a straight line in a nomographic chart; and (b) a second rotor set including a first, a second, and a third rotor which are so linked mechanically as to have rotational speeds thereof arrayed on a straight line in a nomographic chart. The first and second rotor sets work as a power split device to transmit rotational energy, as produced by a power source, to a driven wheel of the vehicle. The first rotor of the first rotor set is connected mechanically to the driven wheel. The second rotor of the first rotor set is connected mechanically to the first rotor of the second rotor set. The second and third rotors of the second rotor set are so linked as to have signs of power which are different from each other.

Specifically, the signs of power of the second and third rotors of the second rotor set are different from each other, thus enabling the sign of the speed of the first rotor of the second rotor set to be reversed even when the signs of speeds of the second and third rotors of the second rotor set remain unchanged. This permits the sign of power of the second rotor of the first rotor set to be reversed by reversing the sign of power of the first rotor of the second rotor set, thereby enabling a condition in which the signs of power of the second and third rotor of the first rotor set are identical with each other to be switched to a condition in which the signs of power of the second and third rotor of the first rotor set are different from each other, in other words, a power circulation mode in which the power is circulated between the second and third rotors of the first rotor set to be changed to a non power circulation mode in which the power is not circulated between the second and third rotors of the first rotor set.

Note that the sign of power of each of the first to third rotors of the second rotor set has a positive value (i.e., a plus value) when the second rotor set works to output the rotational energy.

In the preferred mode of the invention, the second rotor of the first rotor set and the first rotor of the second rotor set are coupled mechanically together without through the first and third rotor of the first rotor set and the second and third rotor of the second rotor set. The second rotor set is joined mechanically to the power source. The power split device has an operation mode in which the rotational energy, as produced by the power source, is transmitted to the first rotor of the second rotor set only through the second and third rotors of the second rotor set.

The power transmission apparatus may also include a connecting mechanism which is disposed outside the second rotor set and connects between the second and third rotors of the second rotor set mechanically. Specifically, the connecting mechanism establishes a looped bypass power transmission path which extends between the second and third rotors of the second rotor set outside the second rotor set. The second and third rotors of the second rotor set are coupled together through the looped bypass power transmission path, thereby achieving a condition in which the second and third rotors of the second rotor set are different in sign of power from each other and permitting only a single electric rotating machine to be used in mechanical connection with the power transmission apparatus, unlike conventional hybrid vehicles.

The second and third rotors of the second rotor set are connected mechanically through the bypass power transmission path in which the connecting mechanism is disposed. The power transmission apparatus may further include a speed variator which is disposed in the bypass power transmission path and works to convert a speed of rotation of an input thereof into a speed of rotation of an output thereof at a variable output-to-input speed ratio. The speeds of the second and third rotors of the second rotor set are enabled to be changed by controlling an operation of the speed variator when the speed of the first rotor f the second rotor set is reversed in sign, that is, the direction of rotation of the first rotor is reversed.

The power transmission apparatus may further include a first branch path and a second branch path which are connected mechanically to the connecting mechanism. The first branch path leads to the power source. The second branch path extends to the first rotor set. When the signs of power of the second and third rotor of the second rotor set are opposite each other, it will cause the rotational energy to be circulated in the bypass power transmission path, thus resulting in a decrease in efficiency of use of the rotational energy. However, the second branch path serves to create therein a flow of the rotational energy from the bypass power transmission path, thereby minimizing the loss of the rotational energy.

The power transmission apparatus may further include a speed variator which connects two of the first to third rotors of the first and second rotor sets and converts a speed of rotation of an input thereof into a speed of rotation of an output thereof at a variable output-to-input speed ratio. The second and third rotors of the second rotor set are connected mechanically through a bypass power transmission path. The direction of flow of rotational energy in a portion of the bypass power transmission path is enabled to be reversed within a variable range in which the output-to-input speed ratio of the speed variator is permitted to be changed. This structure enables the output-to-input speed ratio of the speed variator to be regulated to change a condition in which the rotational energy is circulated in the bypass power transmission path to a condition in which the rotational energy flows out of the bypass power transmission path to the second branch path to eliminate the circulation of the rotational energy.

The speed variator also works to change the speeds of the second and third rotors of the second rotor set variably when the speed of rotation of the first rotor of the second rotor set is reversed in sign.

Two of the first, second, and third rotors of the first rotor set are connected mechanically to two of the first, second, and third rotor of the second rotor set.

The power transmission apparatus may also include a first switching mechanism and a second switching mechanism. The first switching mechanism is placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set. The second switching mechanism is placed selectively in one of an engaged state establishing a mechanical connection between the second rotor of the first rotor set and one of the second rotor and the third rotor of the second rotor set and a disengaged state blocking the mechanical connection between the second rotor of the first rotor set and the one of the second rotor and the third rotor of the second rotor set. This structure permits a joint of the second rotor of the first rotor set to the second rotor set be changed according to a driven state of the power source or the driven wheel.

The power transmission apparatus may also include a speed variator which is disposed in at least one of a power transmission path mechanically connecting the power source and the second rotor set and a power transmission path mechanically connecting the first rotor set and the second rotor set and works to convert a speed of rotation of an input thereof into a speed of rotation of an output thereof at a variable output-to-input speed ratio. When the first switching mechanism is placed in the engaged state, and the second switching mechanism is in the disengaged state, a first operation mode is entered, while when the first switching mechanism is placed in the disengaged state, and the second switching mechanism is in the engaged state, a second operation mode is entered. A power transmission path is provided between the power source and the driven wheel. A derivative value of a function, in which the output-to-input speed ratio of the speed variator is expressed by an independent variable, and a total output-to-input speed ratio of the power transmission path is expressed by a dependent variable, with respect to the independent variable in the first operation mode is opposite in sign to that in the second operation mode. This structure enables the direction in which the output-to-input speed ratio of the speed variator is changed to be reversed upon switching from the first operation mode to the second operation mode to change the total output-to-input speed ratio further in the same direction as in the first operation mode. This permits a range in which the total output-to-input speed ratio is changed to be broadened by selecting the output-to-input speed ratio of the speed variator. This also allows the speed variator to be reduced in size.

The power transmission apparatus may also include a mode-switching speed variator which is disposed in at least one of a first power transmission path which is established in the first operation mode and extends between the first rotor of the second rotor set and the second rotor of the first rotor set and a second power transmission path which is established in the second operation mode and extends between one of the second rotor and the third rotor of the second rotor set and the second rotor of the first rotor set. The mode-switching speed variator serves to compensate for a difference in speed between the first rotor of the second rotor set and the second rotor of the first rotor set or between the one of the second rotor and the third rotor of the second rotor set and the second rotor of the first rotor set which occurs upon switching between the first and second operation modes. This structure enables the omission of transmission of power or torque upon switching between the first and second operation modes to be eliminated.

The power source includes an electric rotating machine and an internal combustion engine. The power transmission apparatus may further include a torque transmission control mechanism which selectively establishes and blocks transmission of power between the first rotor of the second rotor set and the internal combustion engine.

In other words, the power transmission apparatus is so designed that the powers of the second and third rotors of the second rotor set are opposite in sign to each other when the torque is transmitted from the first rotor of the second rotor set to the internal combustion engine through the torque transmission control mechanism. The power is, therefore, circulated between the second and third rotors of the second rotor set, thus enabling the speed of the first rotor of the second rotor set to be set to zero (0) or a very low speed or the power of the first rotor of the second rotor set to be decreased to a very low level easily. Therefore, for example, when the engine is at rest, and it is required to apply initial torque to the internal combustion engine through the first rotor of the second rotor set to start the internal combustion engine, a rate at which the torque to be applied to the engine is increased may be changed slowly, thus minimizing mechanical vibrations which occur when the engine is being cranked and are to be transmitted to the power transmission apparatus, the driven wheels, and the operator of the vehicle. After completion of the application of initial torque to the internal combustion engine through the first rotor, the torque, as produced by the internal combustion engine, may be outputted to the power transmission apparatus (i.e., the first rotor or other rotors).

The torque transmission control mechanism may include an electronically-controlled breaker which blocks the transmission of power between the first rotor of the second rotor set and the internal combustion engine, thereby avoiding the transmission of power from the first rotor of the second rotor set to the internal combustion engine before the internal combustion engine is started, which eliminates the loss of rotational energy arising from application of torque to a rotating shaft of the internal combustion engine immediately before started.

The torque transmission control mechanism may also include a one-way power transmission mechanism which establishes the transmission of power between the first rotor of the second rotor set and the internal combustion engine under condition that a speed of an input of the one-way power transmission mechanism leading to the first rotor is higher than or equal to that of an output of the one-way power transmission mechanism leading to the internal combustion engine, thereby avoiding the transmission of torque from the internal combustion engine to the first rotor of the second rotor set when the torque is produced upon start of combustion of fuel in a combustion chamber of the internal combustion engine. Usually, when the torque is produced by the combustion of fuel in the internal combustion engine, the speed of a rotating shaft (i.e., and output shaft) of the internal combustion engine rises quickly. The quick rise in speed of the rotating shaft will occur in a short time. It is, therefore, very difficult or impossible to disconnect between the internal combustion engine and the first rotor of the second rotor set after the start of combustion of fuel is detected. When the quick rise in speed is transmitted to the first rotor of the second rotor set, it will result in pulsation of torque in the power transmission apparatus. In order to avoid this problem, the one-way power transmission mechanism works not to transmit the torque from the internal combustion engine to the first rotor when the speed of the internal combustion engine rises, so that the speed of the output of the one-way power transmission mechanism is higher than that of the input of the one-way power transmission mechanism, thereby eliminating the transmission of torque pulsation to an operator of the vehicle.

The power transmission apparatus may further include a second torque transmission control mechanism which selectively establishes and blocks transmission of power between one of the first to third rotor of the second rotor set other than the first rotor and the internal combustion engine. Specifically, the first rotor of the second rotor set serves as an engine starting rotor to be coupled to the internal combustion engine when starting the engine. One of the first to third rotors of the second rotor set other than the first rotor serves as a power transmitted rotor which is to be coupled to the internal combustion engine and to which torque is transmitted from the internal combustion engine. The engine starting rotor is different from the power transmitted rotor, thus enabling the speed of the internal combustion engine to be brought to an effective speed range quickly.

Each of the first, second, and third rotors of each of the first and second rotor sets may be one of a sun gear, a carrier, and a ring gear of a planetary gear set.

According to the second aspect of the invention, there is provided a power transmission control system for a vehicle which comprises: (a) a first rotor set including a first, a second, and a third rotor which are so linked mechanically as to have rotational speeds thereof arrayed on a straight line in a nomographic chart; (b) a second rotor set including a first, a second, and a third rotor which are so linked mechanically as to have rotational speeds thereof arrayed on a straight line in a nomographic chart; (c) a first and a second switching mechanism; and (d) a controller. The first and second rotor sets work as a power split device to transmit rotational energy, as produced by a power source, to a driven wheel of a vehicle. The first rotor of the first rotor set is connected mechanically to the driven wheel. The second rotor of the first rotor set is connected mechanically to the first rotor of the second rotor set. The second and third rotors of the second rotor set are so linked as to have signs of power which are different from each other. The first switching mechanism is placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set. The second switching mechanism is placed selectively in one of an engaged state establishing a mechanical connection between the second rotor of the first rotor set and the second rotor of the second rotor set and a disengaged state blocking the mechanical connection between the second rotor of the first rotor set and the second rotor of the second rotor set. The controller places both the first and second switching mechanisms in the disengaged states thereof when a travel permission switch for the vehicle is in an off-state. This avoids undesirable rotation of the speed variator when the vehicle is towed.

According to the third aspect of the invention, there is provided a power transmission control system for a vehicle which comprises: (a) a first rotor set including a first, a second, and a third rotor which are so linked mechanically as to have rotational speeds thereof arrayed on a straight line in a nomographic chart; (b) a second rotor set including a first, a second, and a third rotor which are so linked mechanically as to have rotational speeds thereof arrayed on a straight line in a nomographic chart; (c) a first and a second switching mechanism; (d) a speed variator which is disposed in at least one of a power transmission path mechanically connecting the power source and the second rotor set and a power transmission path mechanically connecting the first rotor set and the second rotor set and works to convert a speed of rotation of an input thereof into a speed of rotation of an output thereof at a variable output-to-input speed ratio; and (d) a controller. The first and second rotor sets work as a power split device to transmit rotational energy, as produced by a power source, to a driven wheel of a vehicle. The first rotor of the first rotor set is connected mechanically to the driven wheel. The second rotor of the first rotor set is connected mechanically to the first rotor of the second rotor set. The second and third rotors of the second rotor set are so linked as to have signs of power which are different from each other. The first switching mechanism is placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set. The second switching mechanism is placed selectively in one of an engaged state establishing a mechanical connection between the second rotor of the first rotor set and the second rotor of the second rotor set and a disengaged state blocking the mechanical connection between the second rotor of the first rotor set and the second rotor of the second rotor set. When the first switching mechanism is placed in the engaged state, and the second switching mechanism is in the disengaged state, a first operation mode is entered, while when the first switching mechanism is placed in the disengaged state, and the second switching mechanism is in the engaged state, a second operation mode is entered. A power transmission path is provided between the power source and the driven wheel. A derivative value of a function, in which the output-to-input speed ratio of the speed variator is expressed by an independent variable, and a total output-to-input speed ratio of the power transmission path is expressed by a dependent variable, with respect to the independent variable in the first operation mode is opposite in sign to that in the second operation mode. The controller controls the output-to-input speed ratio of the speed variator so that the total output-to-input speed ratio to have values different between the first and second operation modes and then places both the first and second switching mechanisms in the engaged states thereof when a travel permission switch for the vehicle is turned off. This enables the driven wheel to be locked.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2(a) is a schematic block diagram which shows a power transmission path when a geared neutral is established in a first operation mode of the power transmission device of FIG. 1(a);

FIG. 2(b) is a nomographic chart which represents an operation of a power split device of the power transmission device of FIG. 1(a);

FIG. 2(c) is a table which lists a relation in sign of rotational direction, torque, and power among a sun gear, a carrier, and a ring gear of a first planetary gear set of the power split device of FIGS. 2(a) and 2(b);

FIG. 3(a) is a schematic block diagram which shows a power transmission path when the power transmission device of FIG. 1(a) is in a power split mode in a first operation mode;

FIG. 3(b) is a nomographic chart which represents an operation of a power split device of the power transmission device of FIG. 3(a);

FIG. 3(c) is a table which lists a relation in sign of rotational direction, torque, and power among a sun gear, a carrier, and a ring gear of the power split device of FIGS. 3(a) and 3(b);

FIG. 6(a) is a schematic block diagram which shows a power transmission path when an internal combustion engine is started in a second operation mode of the power transmission device of FIG. 1(a);

FIG. 6(b) is a nomographic chart which represents an operation of a power split device of the power transmission device of FIG. 6(a);

FIG. 6(c) is a table which lists a relation in sign of rotational direction, torque, and power among a sun gear, a carrier, and a ring gear of a second planetary gear set of the power split device of FIGS. 6(a) and 6(b);

DESCRIPTION OF THE PREFERRED EMBODIMENTS

Figure 1A:
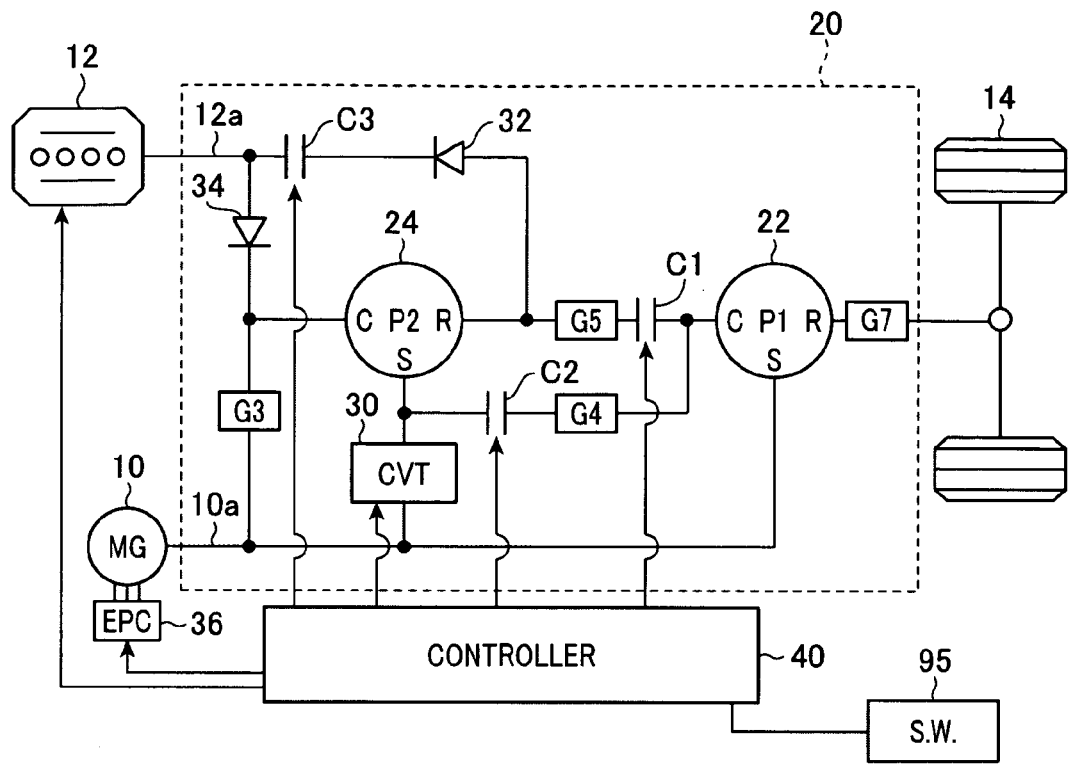
FIG. 1(a) is a block diagram which illustrates a power transmission device of the first embodiment of the invention which is installed in a hybrid system for a vehicle.
Figure 1B:
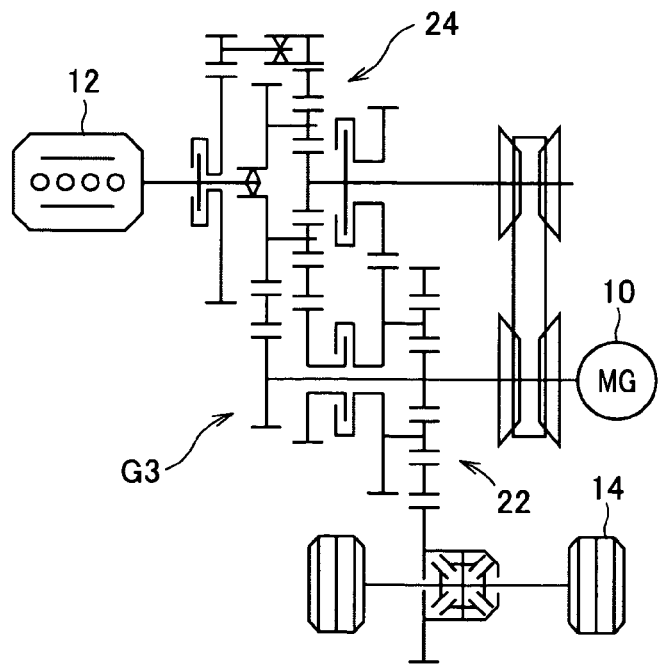
FIG. 1(b) is a view of power transmission paths of the power transmission device of FIG. 1(a)

Referring to the drawings, wherein like reference numbers refer to like parts in several views, particularly to FIGS. 1(a) and 1(b), there is shown a hybrid system equipped with a power transmission control system according to the first embodiment of the invention. The power transmission control system is equipped with a power transmission device and a controller working to control an operation of the power transmission device.

FIG. 1(a) illustrates the structure of the hybrid system. FIG. 1(b) is a skeleton view of power transmission paths.

The hybrid system includes a motor-generator 10, an internal combustion engine 12 (e.g., a gasoline engine), and a power transmission device 20. The motor-generator 10 is made of a three-phase ac motor-generator and works as an in-vehicle power producing device along with the internal combustion engine 12 to run an automotive vehicle. The power transmission device 20 is equipped with first planetary gear set 22 and a second planetary gear set 24 which work as a power split device to split power or torque among the motor-generator 10, the internal combustion engine 12, and driven wheels 14 of the vehicle.

Each of the first and second planetary gear sets 22 and 24 is made up of three power split rotors: a sun gear S, a carrier C, and a ring gear R. The power transmission device 20, thus, uses a total of six power split rotors to split the power among the motor-generator 10, the internal combustion engine 12, and the driven wheels 14.

The motor-generator 10 is coupled mechanically to the sun gear S of the first planetary gear set 22 and also to the carrier C of the second planetary gear set 24 through a gear G3. The motor-generator 10 is further coupled mechanically to the sun gear S of the second planetary gear set 24 through a continuously variable transmission (CVT) 30. In other words, the motor-generator 10 and the carrier C and the sun gear S of the second planetary gear set 24 are connected together through a mechanical interlocking path so that they rotate in conjunction with each other without through the other power split rotors of the power transmission device 20. The CVT 36, as used in this embodiment, is of a mechanical type using a metallic or rubber belt. The gear G3 works to convert the speed of an input thereof at a fixed gear ratio into that of an output thereof and is implemented by a forward gear in which the speeds of the input and the output are identical in sign with each other, in other words, the rotational directions of the input and the output are identical with each other. Note that the input and the output, as referred to herein, an input into which the energy is entered and an output from which the energy goes out.

The driven wheels 14 are coupled mechanically to the ring gear R of the first planetary gear set 22 through a gear G7. The gear G7 is implemented by a counter gear which works to change a ratio of rotational speed of an input to that of an output thereof by a fixed factor and reverse the direction of rotation of the input.

The carrier C of the first planetary gear set 22 and the ring gear R of the second planetary gear set 24 are joined mechanically together through the gear G5 and a clutch C1. The carrier C of the first planetary gear set 22 and the sun gear S of the second planetary gear set 24 are joined mechanically together through the gear G4 and a clutch C2. Each of the clutches C1 and C2 works as an electronically controlled switching mechanism to switch between an engaged state in which an input and an output thereof are engaged and a disengaged state in which the input and the output are disengaged. Each of the gears G4 and G5 is implemented by a counter gear which works to change a ratio of rotational speed of an input to that of an output thereof by a fixed factor and reverse the direction of rotation of the input.

The crankshaft (i.e., the rotating shaft 12a) of the engine 12 is coupled mechanically to the ring gear R of the second planetary gear set 24 through a one-way bearing 32 and a clutch C3. The rotating shaft 12a is also joined mechanically to the carrier C of the second planetary gear set 24 through a one-way bearing 34. The clutch C3 serves as an electronically controlled switching mechanism to switch between an engaged state in which an input and an output thereof are engaged to transmit the power therethrough and a disengaged state in which the input and the output are disengaged to block the transmission of power. The clutch C3 is of a normally open type. The one-way bearing 32 serves as a one-way power transmission mechanism to establish transmission of power therethrough when the speed of an input thereof leading to the ring gear R is not lower than that of an output thereof leading to the rotating shaft 12a. In other words, the one-way bearing 32 permits the output thereof to follow the rotation of the input unless the speed of the output is greater than that of the input. Similarly, the one-way bearing 34 serves as a one-way power transmission mechanism to establish transmission of power therethrough when the speed of an input thereof leading to the internal combustion engine 12 is not lower than that of an output thereof leading to the carrier C. In other words, the one-way bearing 34 permits the output thereof to follow the rotation of the input unless the speed of the output is greater than that of the input.

FIG. 1(b) is a skeleton view of the power transmission device 20. The gear G3 is, as can be seen from the drawing, is a gear assembly or a gear set made up of three gears.

The hybrid system also includes a controller 40 to control an operation of the power transmission device 20. Specifically, the controller 40 controls operations of the clutches C1, C2, and C3 to regulate the mode of power transmission and determines a controlled variable of the engine 12. The controller 40 also controls an operation of a power converter 36 to determine a controlled variable of the motor-generator 10.

The power transmission device 20 is so designed as to operate selectively either in a first operation mode or a second operation mode. The controller 40 switches the operation of the power transmission device between the first and second operation modes. In the operation mode, the clutch C1 is in an engaged state, while the clutch C2 is in a disengaged state. In the second operation mode, the clutch C1 is in the disengaged state, while the clutch C2 is in the engaged state. The operations of the power transmission device 20 in the first and second operation modes and a sequence of running states of the vehicle when the first operation mode is switched to the second operation mode will be described below, respectively.

First Operation Mode

FIGS. 2(a) to 2(c) show a geared neutral in the first operation mode. FIG. 2(a) illustrates a power transmission path of the power transmission device 20 in the first operation mode. FIG. 2(b) is a nomographic chart which represents speeds of the sun gears S, the carriers C, and the ring gears R of the first and second planetary gear sets 22 and 24 along with the speed of the internal combustion engine 12. In FIG. 2(b), a negative direction of rotation of the ring gear R of the first planetary gear set 22 (also indicated by "P1") is defined as "forward" because the gear G5 is made of a counter gear.

When the first operation mode is entered, the controller 40 disengages the clutch C3 and stops the engine 12. The speeds of rotation of the power split rotors of the power transmission device 20 are dependent on the speed of the motor-generator 10 and the gear ratio (also called an output-to-input speed ratio, a variable speed ratio, a pulley ratio, or a CVT ratio) of the CVT 30. Specifically, the adjustment of the speeds of rotation of the sun gear S and the carrier C of the second planetary gear set 24 will determine the speeds of the other power split rotors because the speeds of the sun gears S, the carrier C, and the ring gear S of the first planetary gear set 22 lie on a straight line in the nomographic chart, and the speeds of the sun gears S, the carrier C, and the ring gear S of the second planetary gear set 24 also lie on a straight line in the nomographic chart. In other words, the sun gear S, the carrier C, and the ring gear R of each of the first and second planetary gear sets 22 and 24 are so linked as to provide output rotational energies thereof which are arrayed straight in the nomographic chart.

As apparent from the drawing, in the first operation mode, the so-called geared neutral in which the speed of the driven wheels 14 is kept zero (0) even when a power source (i.e., the motor-generator 10) is running is permitted to be achieved. This is because the power transmission device 20 is so designed that amounts of output rotational energy (i.e., power) of the sun gear S and the carrier C that are the power split rotors of the first planetary gear set 22 other than the ring gear R thereof are, as illustrated in FIG. 2(c), opposite in sign to each other, so that the power is circulated between the sun gear S and the carrier C through a looped mechanical path, in other words, the rotational energy inputted into the sun gear S is outputted from the carrier C and then inputted into the sun gear S again. Therefore, when the power transmission device 20 is in the geared neutral, the amount of rotational energy (i.e., power) outputted to the driven wheels 14 will be zero (0). When the power is not circulated through the looped mechanical path extending through the sun gear S and the carrier C, it will cause the output energy of the motor-generator 10 to be consumed fully as thermal energy in the power transmission device 20 according to the energy conservation law. This will result in unuseful structure of the power transmission device 20 which does not work as the power split device to split the power. Consequently, achievement of the geared neutral requires the circulation of power in the power transmission device 20. Note that in FIG. 2(c), the plus (+) and minus (−) signs of the rotational direction (or speed) of the sun gear S, the carrier C, and the ring gear R represent opposite directions: a normal direction and a reverse direction thereof, the plus (+) sign of the rotational energy (i.e., power) indicates when the rotational energy is outputted from the power transmission device 20, and the plus (+) and minus (−) signs of the torque are so defined as to meet the condition that the product of signs of the rotational direction and the torque will be the sign of the rotational energy (i.e., power).

The structure of the power transmission device 20 of this embodiment is designed to enable the motor-generator 10 to produce a higher degree of torque when starting the vehicle without need for increasing the size of the motor-generator 10. This will also be described later in a section "INFINITE TORQUE IN FIRST OPERATION MODE"

FIGS. 3(a) to 3(b) illustrate an operational status of the power transmission device 20 placed in a power split mode in which powers of the carrier C and the sun gear S of the first planetary gear set 22 (also indicated by "P1") are identical in sign with each other, so that the power is not circulated between the carrier C and the sun gear S of the first planetary gear set 22. This mode is accomplished by the structure in which a reversal of the sign of power of the ring gear R of the second planetary gear set 24 (also indicated by "P2") will result in reversal of the sign of power of the carrier C of the first planetary gear set 22. The reason why the sign of the power of the ring gear R of the second planetary gear set 24 is enabled to be changed or reversed is because the powers of the sun gear S and the carrier C of the second planetary gear set 24 are, as indicated in FIG. 3(c), opposite in sign to each other. Consequently, the sing of speed of rotation of the ring gear R of the second planetary gear set 24 is permitted to be negative, positive sign, or zero (0).

The condition of the first planetary gear set 22 in which the circulation of power disappears may be changed with changes in gear ratio of the CVT 30 and speed of the motor-generator 10. The disappearance of the circulation of power in the first planetary gear set 22 will result in improvement of efficiency of use of energy in the power transmission device 20.

Figure 4A:
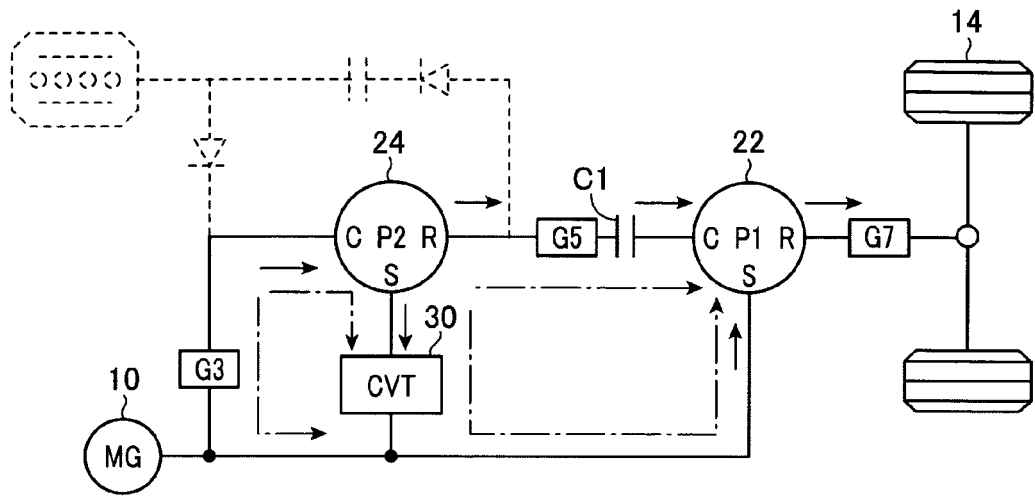
FIG. 4(a) is a schematic block diagram which shows a power transmission path when the power transmission device of FIG. 1(a) is in a first operation mode.
Figure 4B:
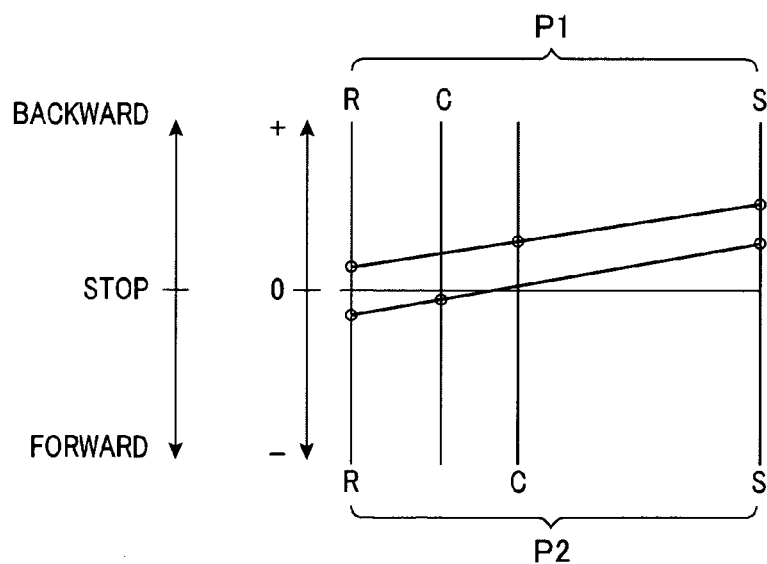
FIG. 4(b) is a nomographic chart which represents an operation of a power split device of the power transmission device of FIG. 4(a)

FIGS. 4(a) and 4(b) illustrate the operational status of the power transmission device 20 in which the circulation of rotational energy (i.e., power) through a looped mechanical path extending between the sun gear S and the carrier C of the second planetary gear set 24 bypassing the other power split rotors disappears. This will be taken placed because the looped mechanical path connects with both a first branch path leading to the power source (i.e., the motor-generator 10) and a second branch path leading to the sun gear S of the first planetary gear set 22, so that the rotational energy will flow out of the looped mechanical path into the second branch path, thus causing the direction in which the rotational energy flows through the gear G3 to be reversed to eliminate the circulation of power through the looped mechanical path. The disappearance of the circulation of power causes the amount of rotational energy (i.e., power) per unit time in the looped mechanical path to be smaller than the output of the power source (i.e., the motor-generator 10), thus resulting in improvement of efficiency in use of the energy in the power transmission device 20.

When the direction of flow of the rotational energy is reversed at the gear G3, the moment when the amount of rotational energy inputted into or outputted from the gear G3 disappears exits. When the gear ratio of the CVT 30 creating such a moment is kept as it is by a gear ratio control signal outputted from the controller 40, it may result in undesirable mechanical noise. It is, thus, advisable that when such a condition is encountered, the controller 40 should change the gear ratio of the CVT 30 purposely.

Second Operation Mode

Figure 5A:
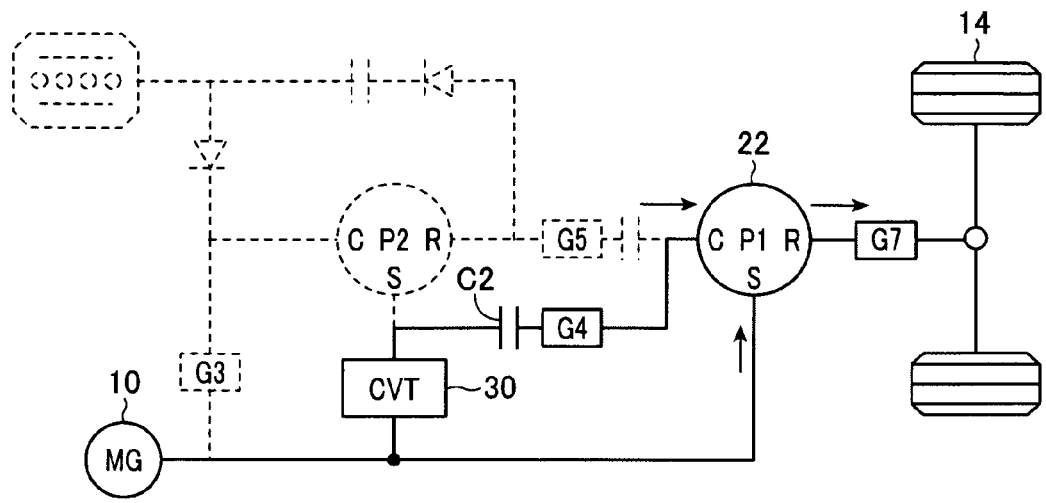
FIG. 5(a) is a schematic block diagram which shows a power transmission path when the power transmission device of FIG. 1(a) is in a second operation mode.
Figure 5B:
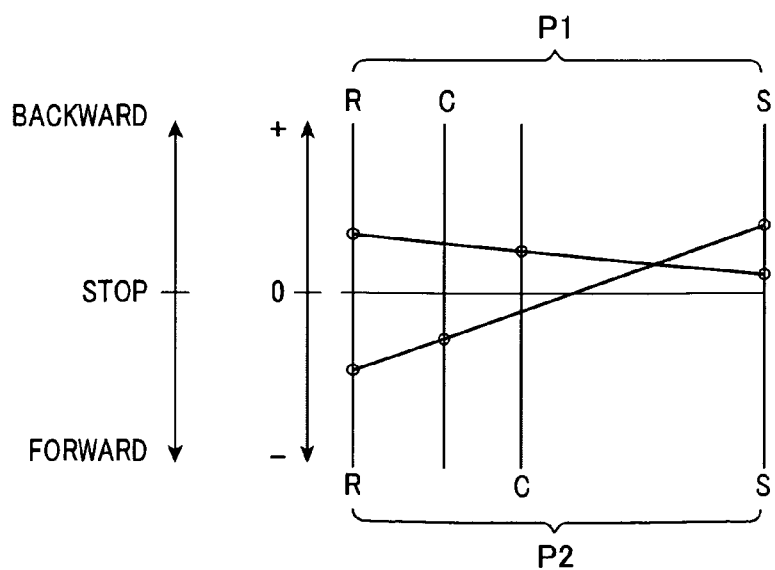
FIG. 5(b) is a nomographic chart which represents an operation of a power split device of the power transmission device of FIG. 5(a)

FIG. 5(a) illustrates a power transmission path in the second operation mode when the power transmission device 20 is placed in an EV (Electric Vehicle) travel mode where the vehicle is run only by the motor-generator 10. FIG. 5(b) shows a nomographic chart in the EV travel mode. In this mode, the clutch C3 is disengaged.

The second planetary gear set 24, as can be seen from the drawing, does not serve to transmit the power at all. This is because torque is not applied to the ring gear R of the second planetary gear set 24, so that the torque is, as apparent from equations (c1) and (c2) below, also exerted on the sun gear S and the carrier C of the second planetary gear set 24.

$$Tr=-Tc/(1+\rho) \qquad (c1)$$

$$Ts=-\rho Tc/(1+\rho) \qquad (c2)$$

where ρ is a ratio of the number Zs of teeth of the sun gear S to the number Zr of teeth of the ring gear R (i.e., Zs/Zr), and Tr, Ts, and Tc are torques of the ring gear R, the sun gear S, and the carrier C, respectively.

The power, as produced by the motor-generator 10, is inputted to the sun gear S of the first planetary gear set 22 and also inputted to the carrier C of the first planetary gear set 22 through the CVT 30, the clutch C2, and the gear G4. This causes powers of the sun gear S and the carrier C of the first planetary gear set 22 other than the ring gear R connected to the driven wheels 14 to be identical in sign with each other, thus permitting the driven wheels 14 to be run at a high degree of efficiency of rotational energy. There are two power transmission paths: one extending from the motor-generator 10 to the first planetary gear set 22 directly and the second extending from the motor-generator 10 to the first planetary gear set 22 through the CVT 30, which increases the efficiency of use of the rotational energy further. This is because the efficiency of transmission of power through the CVT 30 is generally lower than that through, for example, a gear whose gear ratio is fixed.

FIG. 6(a) illustrates a power transmission path when the engine 12 is started in the second operation mode. FIG. 6(b) illustrates a nomographic chart in the operational status of the power transmission device 20 in FIG. 6(a).

When it is required to start the engine 12, the controller 40 engages the clutch C3 to permit the torque, as produced by the motor-generator 10, to be transmitted to the engine 12 through the power transmission device 20. Specifically, the rotational energy of an engine starting rotor (i.e., the ring gear R of the second planetary gear set 24) is transmitted to the rotating shaft 12a of the engine 12 through the one-way bearing 32. FIG. 6(c) is a table which represents signs of rotational direction, torque, and rotational energy (i.e., power) of the sun gear S, the carrier C, and the ring gear R of the second planetary gear set 24. The table shows that the power of the sun gear S and the carrier C of the second planetary gear set 24 are opposite in sign to each other, so that the power will be circulated between the sun gear S and the carrier C. This enables the speed of the ring gear P of the second planetary gear set 24 to be brought to an extremely low value or zero (0) and an absolute value of power of the ring gear R to be also brought to a very low value even when an absolute value of an output of the motor-generator 10 or an input to the driven wheels 14 is not zero (0), thus permitting a difference in speed between the output and the input of the one-way bearing 32 (i.e., a ratio of the speed of the input to that of the output) to be decreased greatly when the clutch C3 is engaged while the rotating shaft 12a of the engine 12 is stopped. This minimizes mechanical vibrations exerted on the power transmission device 20 by cranking of the engine 12 upon the engagement of the clutch C3.

It is preferable that the clutch C3 is engaged when the speed of the engine 12 is lower than or equal to a minimum value required to ensure the stability in running of the engine 12. When the speed of the engine 12 is above the minimum value, the controller 40 starts to burn fuel in the internal combustion engine 12 being running and control the burning of fuel in a combustion control mode.

Figure 7A:
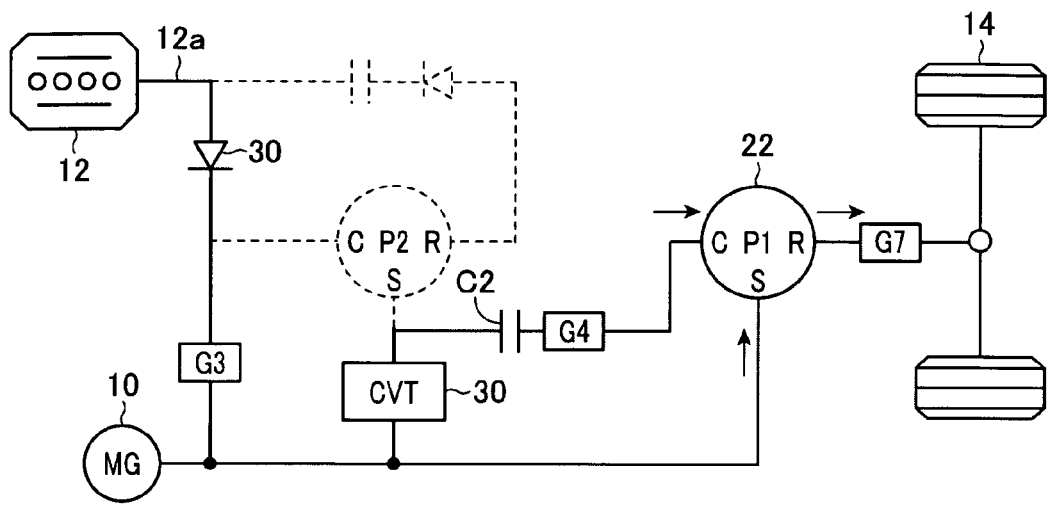
FIG. 7(a) is a schematic block diagram which shows a power transmission path when the power transmission device of FIG. 1(a) works to run a vehicle through an internal combustion engine in a second operation mode.
Figure 7B:
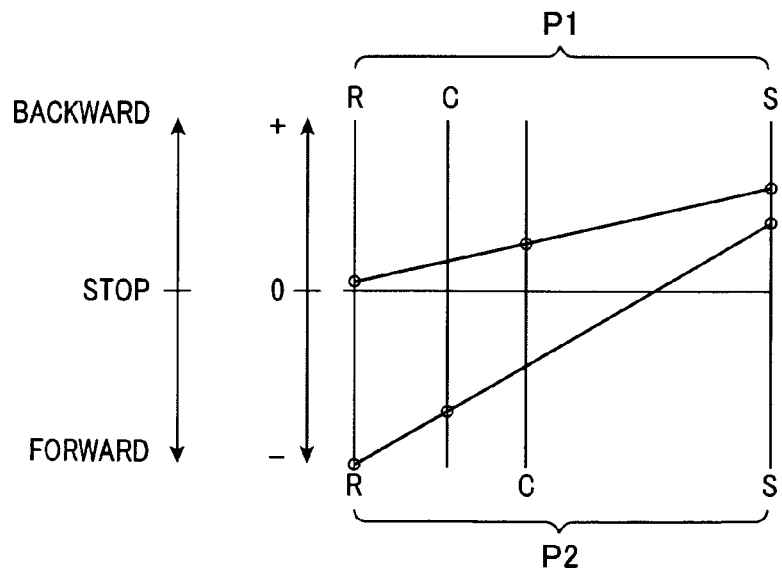
FIG. 7(b) is a nomographic chart which represents an operation of a power split device of the power transmission device of FIG. 7(a)

FIG. 7(a) illustrates a power transmission path when the vehicle is being run by the power of the engine 12 in the second operation mode. FIG. 7(b) illustrates a nomographic chart in the operational status of the power transmission device 20 in FIG. 7(a).

When it is required to run the vehicle through the engine 12, the controller 40 disengages the clutch C3 to permit the power to be transmitted from the motor-generator 10 and the engine 12 to the driven wheels 14 only through the first planetary gear set 22. Specifically, the power, as produced by the engine 12, is transmitted to the driven wheels 14 through two power transmission paths: one extending through the one-way bearing 34, the gear G3, and the sun gear S of the first planetary gear set 22 and the other extending through the one-way bearing 34, the gear G3, the CVT 30, the clutch C2, the gear G4, and the carrier C of the first planetary gear set 22. Similarly, the power, as produced by the motor-generator 10, is transmitted to the driven wheels 14 through two power transmission paths: one extending directly to the sun gear S of the first planetary gear set 22 and the other extending through the CVT 30, the clutch C2, the gear G4, and the carrier C of the first planetary gear set 22. In this engine-powered travel mode, the signs of powers of the carrier C and the sun gear S of the first planetary gear set 22 are both negative, so that the power is not circulated between them.

In the engine-powered travel mode, the motor-generator 10 does not necessarily need to be operated as an electric motor, but may be used as an electric generator only. The motor-generator 10 may alternatively be placed in an off-state.

Switching From First Operation Mode To Second Operation Mode

FIG. 6(a) illustrates a relation between a total gear ratio (i.e., a total output-to-input speed ratio) of a power transmission path extending from the motor-generator 10 or the engine 12 to the driven wheels 14 and the gear ratio of the CVT 30 when the driven wheels 14 are run by the motor-generator 10 or the engine 12. The gear ratio, as referred to herein, may also be expressed by either of an output-to-input speed ratio or an input-to-output speed ratio depending upon which of the input speed and the output speed is considered to be a basis. When the first operation mode is entered, the controller 40 may change the gear ratio of the CVT 30 continuously to change the direction in which the vehicle travels from the backward to the forward direction. When a given gear ratio of the CVT 30 is reached, the operation of the power transmission device 20 is switched to the second operation mode, thereby increasing a range in which the total gear ratio is permitted to be changed.

Figure 8A:
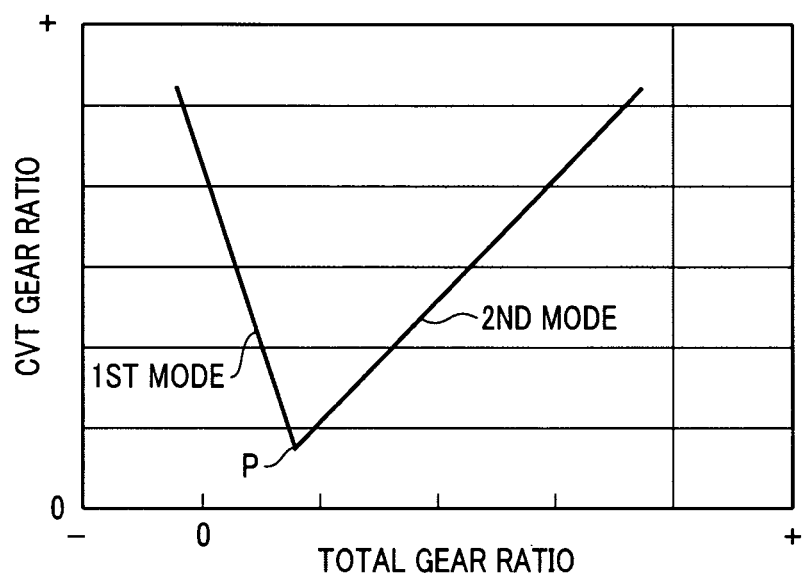
FIG. 8(a) is a graph which shows a relation between a total gear ratio of a power transmission device of the first embodiment and a gear ratio of a CVT.

Specifically, the power transmission device 20 is capable of changing the gear ratio of the CVT 30 in the first operation mode, as demonstrated in FIG. 8(a), to change the rotational direction of the driven wheels 14 from the backward to the forward direction continuously through the instant where the speed of the driven wheels 14 is zero and subsequently changing the gear ratio of the CVT 30 further to increase the total gear ratio in a power transmission path from the motor-generator 10 to the driven wheels 14. When the time the omission of the transmission of torque will not occur is reached, in other words, a mode-switching point P is reached, the power transmission device 20 may switch the first operation mode to the second operation mode and then turn the CVT 30 in the opposite direction (which will also be referred to as a CVT reversing operation below) to increase the total gear ratio further.

The above operation is achieved by selecting the direction in which the total gear ratio changes with a change in gear ratio of the CVT 30 in the second operation mode to be opposite that in the first operation mode. This is established in the condition that a derivative value of a function, in which the gear ratio of the CVT 30 is expressed by an independent variable, and the total gear ratio is expressed by a dependent variable, with respect to the gear ratio of the CVT 30 in the second operation mode is opposite in sign to that in the first operation mode. This condition is realized by the gears G4 and G5. Specifically, the possibility of the CVT reversing operation is dependent upon the sign of a product of gear ratios of the gears G4 and G5. Conditions in which the CVT reversing operation is feasible will be given by a section "CVT REVERSING OPERATION", as will be discussed in the last section of this application.

The controller 40 performs the above first-to-second operation mode switching under the condition that the total gear ratio, that is, a ratio of an output speed that is the speed of the driven wheels 14 to an input speed that is the speed of the motor-generator 10 or the engine 12 is not changed. This condition is met when speeds of an input and an output of the clutch C1 are identical with each other, and speeds of an input and an output of the clutch C2 are identical with each other. The first-to-second operation mode switching may, therefore, be made through the time when both the clutches C1 and C2 are engaged simultaneously, thus avoiding the omission of transmission of torque to the driven wheels 14.

The omission of transmission of torque to the driven wheels 14 is avoided by the means of the gears G4 and G5 in FIG. 1(*a*). The second planetary gear set 24 is, as described above, so constructed that the speeds of the sun gear S, the carrier C, and the ring gear R are either all identical with or all different from each other. In other words, the sun gear S, the carrier C, and the ring gear R are different in speed from each other except when they are all zero (0). It is, therefore, impossible for only the CVT 30 to realize the condition that speeds of the input and the output of the clutch C1 are identical with each other, and speeds of the input and the output of the clutch C2 are identical with each other. Accordingly, the power transmission device 20 has the gear C4 and G5 to ensuring the stability in engagement of the clutches C1 and C2 without the omission of transmission of torque to the driven wheels 14. Specifically, the gear G4 disposed between the sun gear S of the second planetary gear set 24 and the carrier C of the first planetary gear set 22 serves as an operation mode switching speed variator to compensate for a difference in speed between the sun gear S of the second planetary gear set 24 and the carrier C of the first planetary gear set 22 upon switching between the first operation mode and the second operation mode. Similarly, the gear G5 disposed between the ring gear R of the second planetary gear set 24 and the carrier C of the first planetary gear set 22 serve as an operation mode switching speed variator to compensate for a difference in speed between the ring gear R of the second planetary gear set 24 and the carrier C of the first planetary gear set 22 upon switching between the first operation mode and the second operation mode. The power transmission device 20 may have at least one of the gears G4 and G5 to eliminate the omission of transmission of torque upon switching between the first and second operation modes. The sun gear S, the carrier C, and the ring gear R of each of the first and second planetary gear sets 22 and 24, as will be described later in detail, may be exchanged with each other. For example, the sun gear S and the carrier C of the second planetary gear set 24 may be exchanged with each other. In this case, the gear G4 is joined mechanically to the carrier C of the second planetary gear set 24. The gear ratios of the gears G4 and G5 and the CVT 30 required to avoid the omission of transmission of torque to the driven wheels 14 will be discussed later in a section "MODE SWITCHING CONDITION WITHOUT OMISSION OF TRANSMISSION OF TORQUE.

Figure 8B:
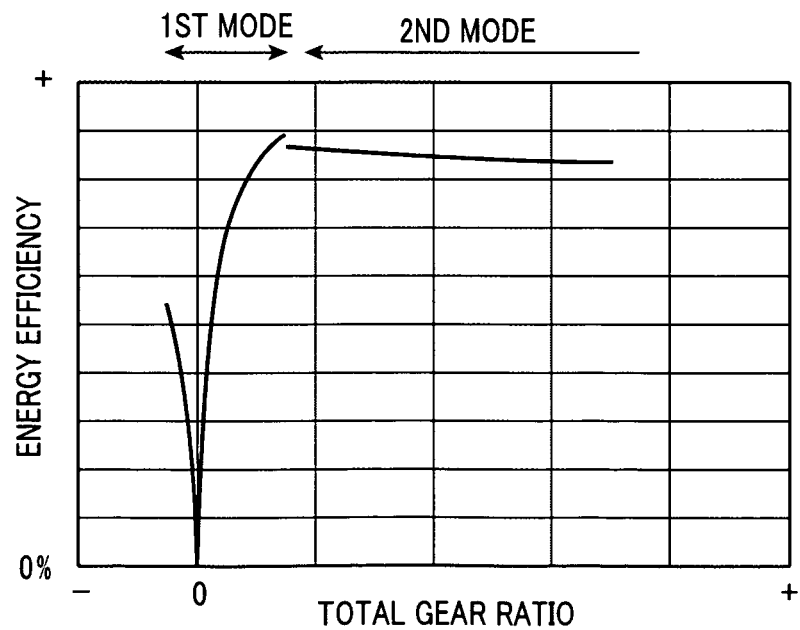
FIG. 8(b) is a graph which shows a relation between a total gear ratio of a power transmission device of the first embodiment and a power transmission efficiency.

As apparent from the above discussion, the switching from the first operation mode to the second operation mode results in an increased range in which the total gear ratio is permitted to be changed. This allows the CVT 30 to be reduced in size. In the second operation mode, the power is not circulated, thus enabling the power transmission efficiency that is the ratio of input energy to output energy in the power transmission device 20 to be increased as compared with in the first operation mode. FIG. 8(*b*) is a graph which represents a relation between the power transmission efficiency and the total gear ratio. The graph shows that a very low range of the power transmission efficiency exists in the first operation mode, but not in the second operation mode. In the graph of FIG. 8(*b*), the power transmission efficiency in the first operation mode immediately before switched to the second operation mode is illustrated as being higher than that in the second operation mode, but it does not mean that the power transmission efficiency when the power transmission device 20 is designed to operate only in the first operation mode is higher than when the power transmission device 20 is designed to be switched between the first and second operation modes.

The controller 40 actuates the power transmission device 20 in the first operation mode to permit the driven wheels 14 to be rotated in the forward and backward directions and stopped as needed without having to change the sign of speed (i.e., the direction of rotation) of the motor-generator 10 even though the power transmission efficiency is low. The controller 40 may also eliminate the circulation of power in the first planetary gear set 22 in a speed range where the driven wheels 14 are rotating in the forward direction in the first operation mode to improve the power transmission efficiency in the first operation mode. The controller 40 may also switch from the first operation mode to the second operation mode in a range where the speed of the driven wheels 14 is higher than a given value to improve the power transmission efficiency and increase the range where the total gear ratio is permitted to be changed.

The sun gear S, the carrier C, and the ring gear R of each of the first and second planetary gear sets 22 and 24, as will be described later in detail, may be exchanged with each other. For example, the sun gear S and the carrier C of the second planetary gear set 24 may be exchanged with each other. In this case, the clutch G2 is joined mechanically to the carrier C of the second planetary gear set 24.

The structure of the hybrid system (i.e., the power transmission device 20) of this embodiment offers the following advantages.

1) The power transmission device 20 is designed to have the structure in which a first rotor (i.e., the ring gear R of the second planetary gear set 24 is coupled mechanically to a second rotor that is one (i.e., the carrier C of the three power split rotors of the first planetary gear set 22 other than a first rotor (i.e., the ring gear R) coupled mechanically to the driven wheels 14, and the remaining two power split rotors (i.e., the sun gear S and the carrier C) of the second planetary gear set 24 are different in sign of power from each other. This enables the condition in which the power is being circulated between the second and third rotors (i.e., the carrier C and the sun gear S) of the first planetary gear set 22 to be changed to the condition in which the power is not circulated between the second and third rotors of the first planetary gear set 22.

2) Two (i.e., the sun gear S and the carrier C) of the three power split rotors of the second planetary gear set 24 are coupled mechanically together through a looped power transmission path (which will also be referred to as a bypass power transmission path below) which extends from one (i.e., the sun gear S) of the two power split rotors to the other (i.e., the carrier C) of the two power split rotors through the CVT 30 and the gear G3 and bypasses the other power split rotor (i.e., the ring gear R) of the second planetary gear set 24, thereby achieving a condition in which the two of the power split rotors are different in sign of power from each other and permitting only a single electric rotating machine (i.e., the motor-generator 10) to be used in mechanical connection with the power transmission device 20, unlike conventional hybrid vehicles.

3) The CVT 30 is disposed in the bypass power transmission path which connects between the sun gear S and the carrier C of the second planetary gear set 24 and bypasses the ring gear R of the second planetary gear set 24, thereby permitting the speeds of the sun gear S and the carrier C of the second planetary gear set 24 to be varied when the direction of rotation of the ring gear R of the planetary gear set 24 is reversed.

4) The first branch path joined mechanically to the motor-generator 10 and the second branch path joined mechanically to one (i.e., the sun gear S) of the power split rotors of the first planetary gear set 22 are connected mechanically to the bypass power transmission which connects between the sun gear S and the carrier C of the second planetary gear set 24 and bypasses the ring gear R of the second planetary gear set 24, thereby enabling the rotational energy to flow from the bypass power transmission path to the second branch path to minimize a decrease in efficiency of use of the energy in the power transmission device 20.

5) The direction of flow of rotational energy in at least a portion of the bypass power transmission path may be reversed in a range where the gear ratio of the CVT 30 is permitted to be changed, thereby enabling the circulation of power to be eliminated within the bypass power transmission path.

6) The power transmission device 20 is equipped with the clutches C1 and C2 which connect the carrier C of the first planetary gear set 22 to the ring gear R and the sun gear S of the second planetary gear set 24, respectively. This enables the controller 40 to select ones of the power split rotors of the first and second planetary gear sets 22 and 24 to be connected together according to controlled conditions of the motor-generator 10, the internal combustion engine 12, or the driven wheels 14.

7) A derivative value of a function, in which the gear ratio of the CVT 30 is expressed by an independent variable, and the total gear ratio in the power transmission path between the power source (i.e., the motor-generator 10 or the engine 12) and the driven wheels 14) is expressed by a dependent variable in the second operation mode is, as described above, set opposite in sign to that in the first operation mode. This enables the CVT reversing operation to broaden the range in which the total gear ratio is permitted to be changed and also permits the CVT 30 to be reduced in size thereof.

8) The power transmission device is equipped with a mechanical measure (i.e., the gears G4 and G5) which compensates for a difference in speed between the ring gear R of the second planetary gear set 24 in the first operation mode and the sun gear S of the second planetary gear set 24 in the second operation mode, thereby eliminating the instantaneous omission of transmission of torque to the driven wheels 14 upon the switching between the first operation mode and the second operation mode.

9) The power transmission device 20 is equipped with a power transmission control mechanism (i.e., the clutch C3 and the one-way bearing 32) which controls the transmission of power between the ring gear R of the second planetary gear set 24 and the engine 12. The power of the sun gear S and the carrier C of the second planetary gear set 24 are, as described above, set opposite in sign to each other, so that the power will be circulated between the sun gear S and the carrier C. This enables the speed of the ring gear R of the second planetary gear set 24 to be brought to an extremely low value or zero (0) and an absolute value of power of the ring gear R to be also brought to a very low value even when an absolute value of an output of the motor-generator 10 or an input to the driven wheels 14 is not zero (0), thus permitting a difference in speed between the output and the input of the power transmission control mechanism to be decreased greatly while the rotating shaft 12a of the engine 12 is stopped. This minimizes mechanical vibrations exerted on the power transmission device 20 by cranking of the engine 12 using the torque transmitted through the power transmission control mechanisms.

10) The power transmission control mechanism is equipped with an electrically-controlled breaker (i.e., the clutch C3) to establish or block the transmission of torque between the engine starting rotor (i.e., the carrier R) of the second planetary gear set 24 and the rotating shaft 12a of the engine 12, thereby avoiding an error in transmission of torque from the engine starting rotor to the engine 12 before the engine 12 is started, which minimizes undesirable consumption of energy or power in the power transmission device 20.

11) The power transmission control mechanism is also equipped with the one-way bearing 32 which establishes the transmission of torque from the second planetary gear set 24 to the rotating shaft 12a of the engine 12 under the condition that the speed of the input of the one-way bearing 32 leading to the engine starting rotor (i.e., the ring gear R of the second planetary gear set 24) is not lower than that of the output of the one-way bearing 32 leading to the speed of the rotating shaft 12a of the engine 12, thereby avoiding the transmission of torque from the engine 12 to the engine starting rotor when the torque is produced upon start of combustion of fuel in a combustion chamber of the engine 12, so that the speed of the rotating shaft 12a of the engine 12 rises quickly. This is because when the speed of the output of the one-way bearing 32 (i.e., the speed of the rotating shaft 12a) is elevated above that of the input of the one-way bearing 32, the one-way bearing 32 blocks the transmission of torque from the output to the input thereof. This avoids the transmission of torque pulsation to the operator of the vehicle.

12) The power transmission device 20 is also equipped with a power transmission control mechanism (i.e., the one-way bearing 34) which selectively establish or block the transmission of power between the engine 12 and two of the power split rotors of the second planetary gear set 24 other than the ring gear R thereof, thereby enabling the operation of the engine 12 to be brought to a high-effective speed range quickly after the engine 12 is started up.

Figure 9:
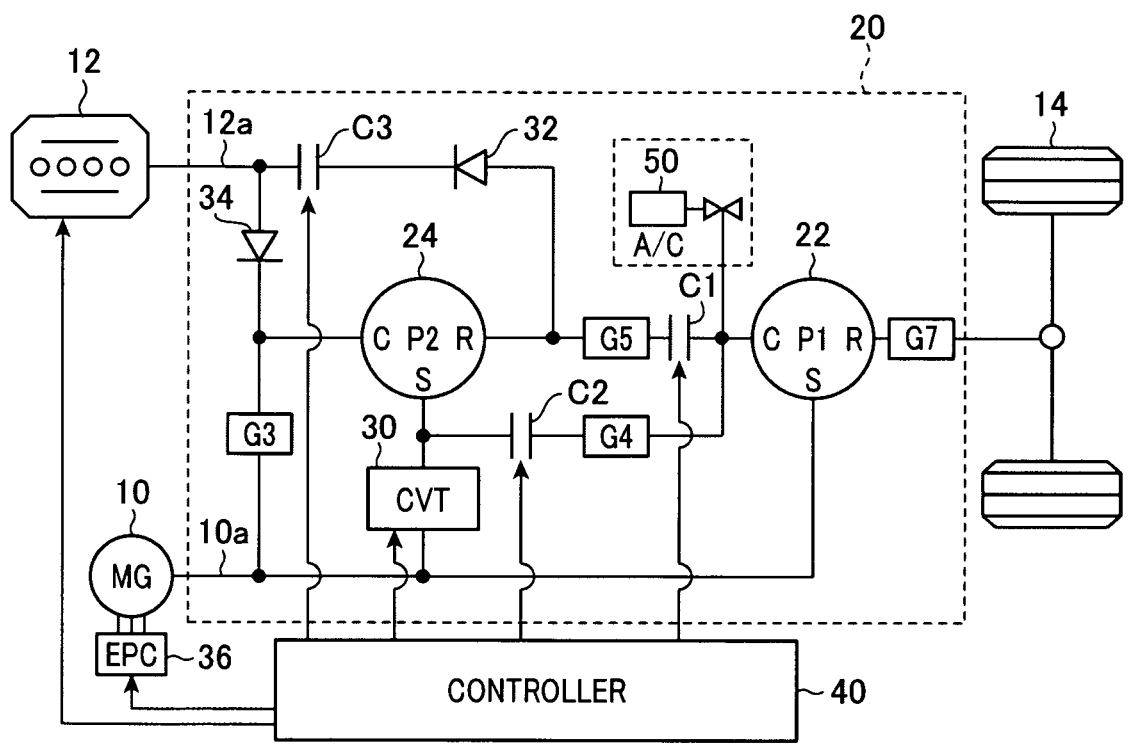
FIG. 9 is a block diagram which illustrates a power transmission device according to the second embodiment of the invention.

FIG. 9 illustrates the power transmission device 20 installed in the hybrid vehicle according to the second embodiment of the invention. The same reference numbers as employed in the first embodiment refer to the same or similar parts, and explanation thereof in detail will be omitted here.

An air conditioner A/C (i.e., a vehicle accessory) is installed in the hybrid vehicle and powered by the power transmission device 20. The air conditioner A/C is equipped with a compressor 50 which has a driven shaft connected mechanically to the carrier C of the first planetary gear set 22, so that the torque is supplied from the carrier C to the driven shaft of the compressor 50. The power transmission device is, as described above, capable of rotating the carrier C of the first planetary gear set 22 at speeds other than zero (0) when the driven wheels 14 are at rest and thus running the air conditioner A/C when the vehicle is parked.

The power transmission device 20 of this embodiment is capable of keeping the efficiency in operation of the motor-generator 10 high when actuating the compressor 50 while the vehicle is stopped. This is achieved by the structure which ensures the torque required to start the vehicle without having to increase the size of the motor-generator 10. In other words, the structure of the power transmission device 20 of this embodiment eliminates the need for increasing the size of the motor-generator 10 to actuate the air conditioner A/C. In this embodiment, a maximum amount of power required to be outputted from the motor-generator 10 to the compressor 50 is 25% to 50% of a maximum amount of power to be outputted from the motor-generator 10. The efficiency of the motor-generator 10 usually decreases as the output therefrom decreases in a range up to a certain output which is smaller than a maximum output of the generator-motor 10. Therefore, the efficiency of the motor-generator 10 is enabled to be kept high when the motor-generator 10 is run only for driving the compressor 50. A maximum output of motor-generators such as ones mounted in conventional hybrid vehicles is usually 50 kW or more which is ten or more than dozen times a maximum required output of the compressor 50 (e.g., several kW). This causes the motor-generator 10 to be run to drive the compressor 50 with a low efficiency when the vehicle is at a stop.

When a required output of the motor-generator 10 is increased with an increase in required traveling performance of the vehicle, the output of the motor- generator 10 may be used mainly to run the vehicle by limiting the amount of energy to drive the compressor 50. Such an increase in output of the motor-generator 10 is usually required to enhance the drivability of the vehicle when being accelerated. The increase in size of the motor-generator 10 in order to meet such a requirement leads to great concern about an increase in production cost thereof. In contrast, the structure of the power transmission device 20 of this embodiment may work to restrict the energy or power required to drive the compressor 50 to ensure the ability to accelerate the vehicle without having to increase the size of the motor-generator 10, which results in improvement on the drivability of the vehicle.

The joining of the compressor 50 to the carrier C of the first planetary gear set 22 does not impinge on the circulation of power, as described in the first embodiment, at all. The structure of the power transmission device 20 of this embodiment, therefore, has the same advantages as those in the first and second operation modes in the first embodiment.

This embodiment also offers an additional beneficial effect below.

13) The use of the power transmission device 20 as a power source for the compressor 50 eliminates the need for an additional electric motor to drive the compressor 50.

Figure 10:
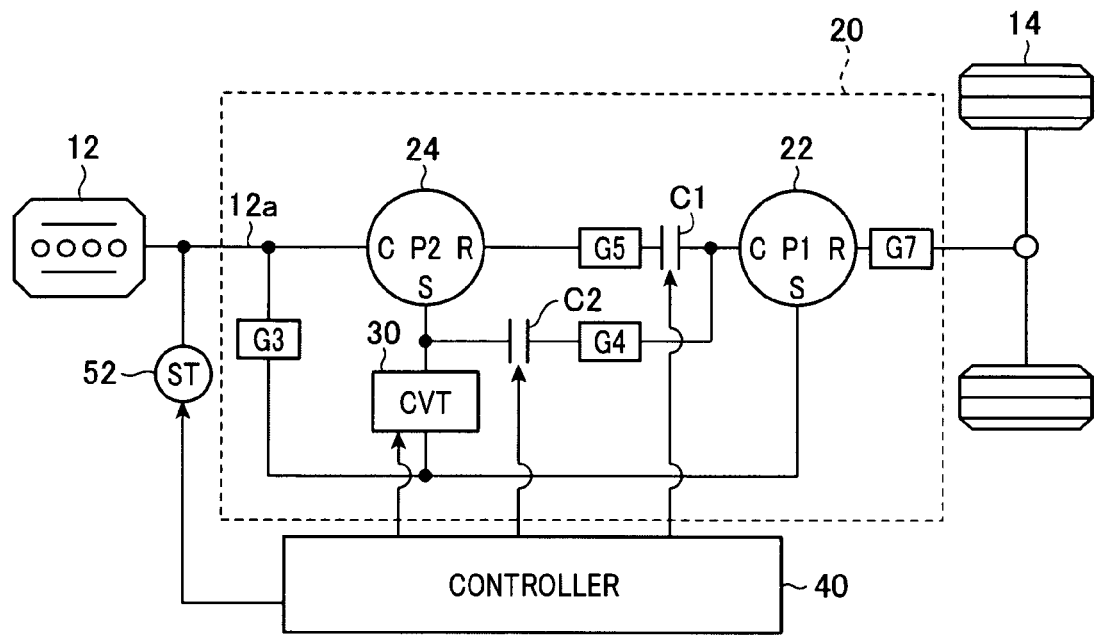
FIG. 10 is a block diagram which illustrates a power transmission device according to the third embodiment of the invention.

FIG. 10 illustrates the power transmission device 20 according to the third embodiment of the invention which is installed in an automotive vehicle powered by only the internal combustion engine 12 working as a main engine. The same reference numbers as employed in the first embodiment refer to the same or similar parts, and explanation thereof in detail will be omitted here.

The power transmission device 20 is capable of achieving the geared neutral which keeps the speed of the driven wheels 14 at zero (0) in the first operation mode, thus eliminating the need for a torque converter. The power transmission device 20 is also capable of running the driven wheels 14 in the forward direction or reversing the direction of rotation of the driven wheels 14 even when the engine 12 is running only in one direction, thus eliminating the need for a gear set which reverses the direction of rotation of the driven wheels 14. The circulation of power between the sun gear S and the carrier C of the first planetary gear set 22 required to achieve the above condition may be eliminated by reversing the direction of rotation of the carrier C of the first planetary gear set 22. When the second operation mode is entered, it enhances the power transmission efficiency in the power transmission device 20 and permits the range in which the total gear ratio can be changed to be widened.

When it is required to start the engine 12, the controller 40 actuates a starter 52 to provide an initial torque to the engine 12.

Other Embodiments

The above embodiments may be modified as discussed below.

Structure of Power Transmission Device 20

Figure 11:
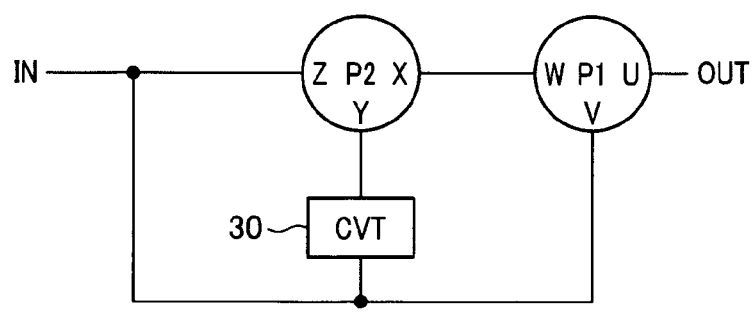
FIG. 11 is a block diagram which illustrates a modification of a power transmission device which may be used in a structure of each of the first, second, and third embodiments.

The power transmission device 20 may have a structure, as shown below. FIG. 11 illustrates a schematic view of a power transmission path in the power transmission device 20. "IN" indicates an input to which the power is transmitted from at least one of the motor-generator 10 and the internal combustion engine 12. "OUT" indicates an output from which the power is transmitted to the driven wheels 14. "P1" indicates the first planetary gear set 22. "P2" indicates the second planetary gear set 24. The first planetary gear set P1 is equipped with three power split rotors U, V, and W which are one of all possible six combinations of the sun gear S, the carrier C, and the ring gear R. Similarly, the second planetary gear set P2 is equipped with three power split rotors X, Y, and Z which are one of all possible six combinations of the sun gear S, the carrier C, and the ring gear R. Consequently, a possible combination of the six power split rotors U, V, W, X, Y, and Z is one of thirty six (36) combinations of (S, C, R, S, C, R), (S, C, R, S, R, C), (S, C, R, C, S, R), (S, C, R, C, R, S), (S, C, R, R, S, C), (S, C, R, R, C, S), (S, R, C, S, C, R), (S, R, C, S, R, C), (S, R, C, C, S, R), (S, R, C, C, R, S), (S, R, C, R, S, C), (S, R, C, R, C, S), (C, S, R, S, C, R), (C, S, R, S, R, C), (C, S, R, C, S, R), (C, S, R, C, R, S), (C, S, R, R, S, C), (C, S, R, R, C, S), (C, R, S, S, C, R), (C, R, S, S, R, C), (C, R, S, C, S, R), (C, R, S, C, R, S), (C, R, S, R, S, C), (C, R, S, R, C, S), (R, S, C, S, C, R), (R, S, C, S, R, C), (R, S, C, C, S, R), (R, S, C, C, R, S), (R, S, C, R, S, C), (R, S, C, R, C, S), (R, C, S, S, C, R), (R, C, S, S, R, C), (R, C, S, C, S, R), (R, C, S, C, R, S), (R, C, S, R, S, C), and (R, C, S, R, C, S).

Power transmission paths making mechanical joints among the power split rotors U, V, W, X of the first planetary gear set P1, mechanical joints among the power split rotors X, Y, and Z of the second planetary gear set P2, and mechanical joints among the power split rotors U, V, W, X, Y, and Z may have disposed therein a mechanism(s) such as a gear or a gear set which is designed to convert an input speed into an output speed at a fixed rate. The signs of powers of the power split rotors V and W of the first planetary gear set P1 or the signs of powers of the power split rotors Y and Z of the second planetary gear set P2 may be set opposite to each other by selecting the location of the gear(s) in the power transmission path or structure of the gear(s). The direction of flow of rotational energy in a portion of a mechanical path connecting the power split rotors Y and Z of the second planetary gear set P2 may be reversed by selecting the gear ratio of the CVT 30. Further, the power transmission path may have disposed therein the clutches C1 and C2 to establish the second operation mode. The power transmission path may also have the clutch C3 to use the power split rotor X as the engine starting rotor.

The power transmission device 20 may alternatively be designed to have one of structures, as illustrated in FIGS. 12(a) to 12(d) or FIGS. 13(a) to 13(c). Like the one in FIG. 11, the first planetary gear set P1 is equipped with three power split rotors U, V, and W which are one of all possible six combinations of the sun gear S, the carrier C, and the ring gear R. Similarly, the second planetary gear set P2 is equipped with three power split rotors X, Y, and Z which are one of all possible six combinations of the sun gear S, the carrier C, and the ring gear R. Consequently, a possible combination of the six power split rotors U, V, W, X, Y, and Z is one of thirty six (36) combinations of (S, C, R, S, C, R), (S, C, R, S, R, C), (S, C, R, C, S, R), (S, C, R, C, R, S), (S, C, R, R, S, C), (S, C, R, R, C, S), (S, R, C, S, C, R), (S, R, C, S, R, C), (S, R, C, C, S, R), (S, R, C, C, R, S), (S, R, C, R, C, S), (S, R, C, R, S, C), (C, S, R, S, C, R), (C, S, R, S, R, C), (C, S, R, C, S, R), (C, S, R, C, R, S), (C, S, R, R, S, C), (C, S, R, R, C, S), (C, R, S, S, C, R), (C, R, S, C, S, R), (C, R, S, C, R, S), (C, R, S, R, S, C), (C, R, S, R, C, S), (R, S, C, S, C, R), (R, S, C, S, R, C), (R, S, C, C, S, R), (R, S, C, C, R, S), (R, S, C, R, S, C), (R, S, C, R, C, S), (R, C, S, S, C, R), (R, C, S, S, R, C), (R, C, S, C, S, R), (R, C, S, C, R, S), (R, C, S, R, S, C), and (R, C, S, R, C, S).

Power transmission paths making mechanical joints among the power split rotors U, V, W, X of the first planetary gear set P1, mechanical joints among the power split rotors X, Y, and Z of the second planetary gear set P2, and mechanical joints among the power split rotors U, V, W, X, Y, and Z may have disposed therein a mechanism(s) such as a gear or a gear set which is designed to convert an input speed into an output speed at a fixed rate. The signs of powers of the power split rotors V and W of the first planetary gear set P1 or the signs of powers of the power split rotors Y and Z of the second planetary gear set P2 may be set opposite to each other by selecting the location of the gear(s) in the power transmission path or structure of the gear(s). Further, the power transmission path may have disposed therein the clutches C1 and C2 to establish the second operation mode. The power transmission path may also have the clutch C3 to use the power split rotor X as the engine starting rotor. The direction of flow of rotational energy in a portion of a mechanical path connecting the power split rotors Y and Z of the second planetary gear set P2 may be reversed by selecting the gear ratio of the CVT 30.

Figure 13A:
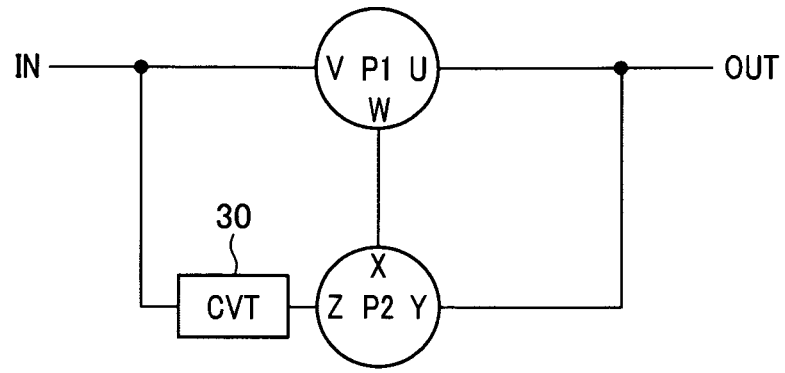
FIGS. 13(a), 13(b), and 13(c) are block diagrams which illustrate modifications of a power transmission device which may be used in a structure of each of the first, second, and third embodiments.
Figure 13B:
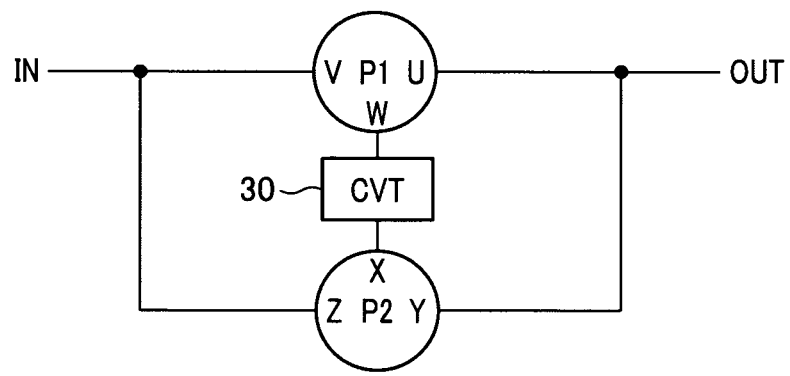
Figure 13C:
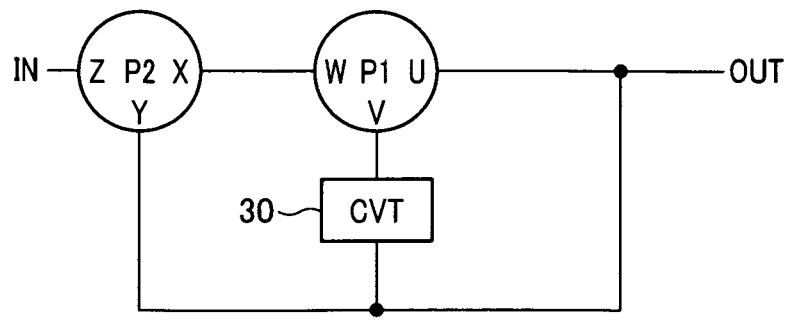

However, each of the structures of FIGS. 13(a) and 13(b) does not have a branch path which connects with the first planetary gear set P1 and diverges from a bypass power transmission path which connects between the power split rotors Y and Z of the second planetary gear set P2 and bypasses the power split rotor X of the second planetary gear set P2. It is, therefore, impossible to select the gear ratio of the CVT 30 to reverse the flow of rotational energy Lu the bypass power transmission path.

Figure 12A:
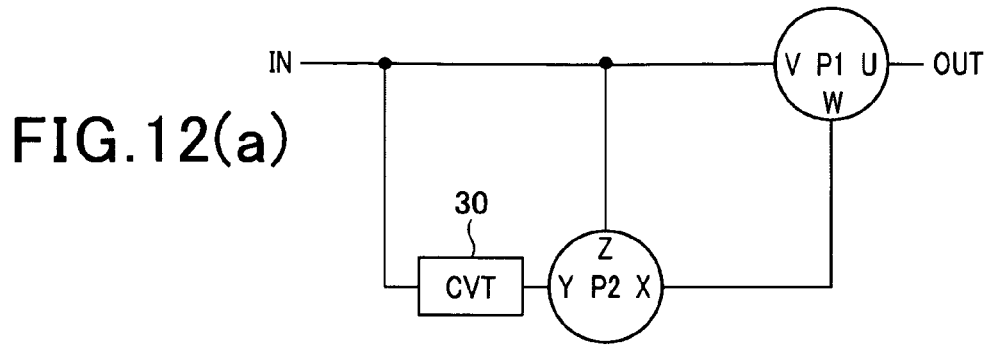
FIGS. 12(a), 12(b), 12(c), and 12(d) are block diagrams which illustrate modifications of a power transmission device which may be used in a structure of each of the first, second, and third embodiments.
Figure 12B:
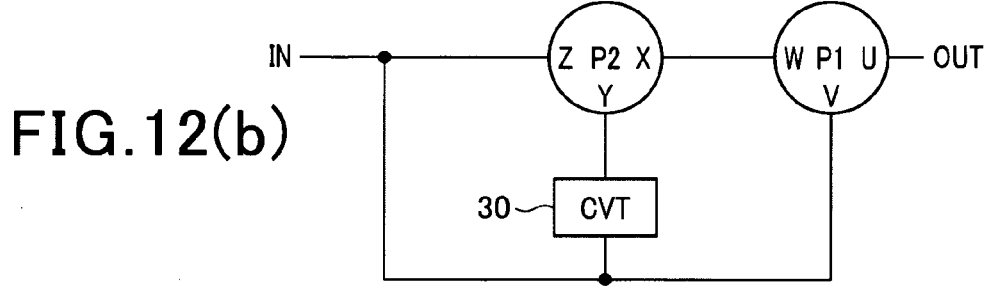
Figure 12C:
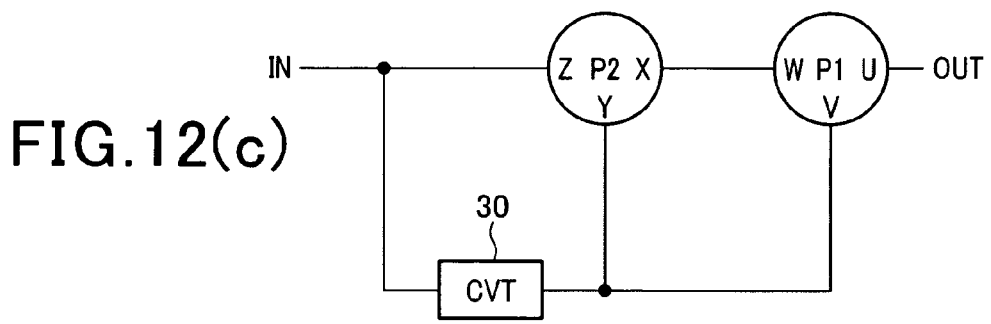
Figure 12D:
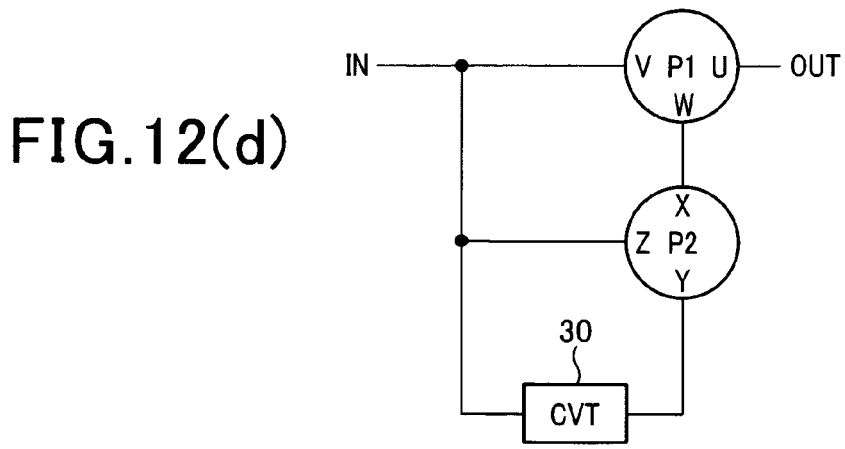
Figure 14:
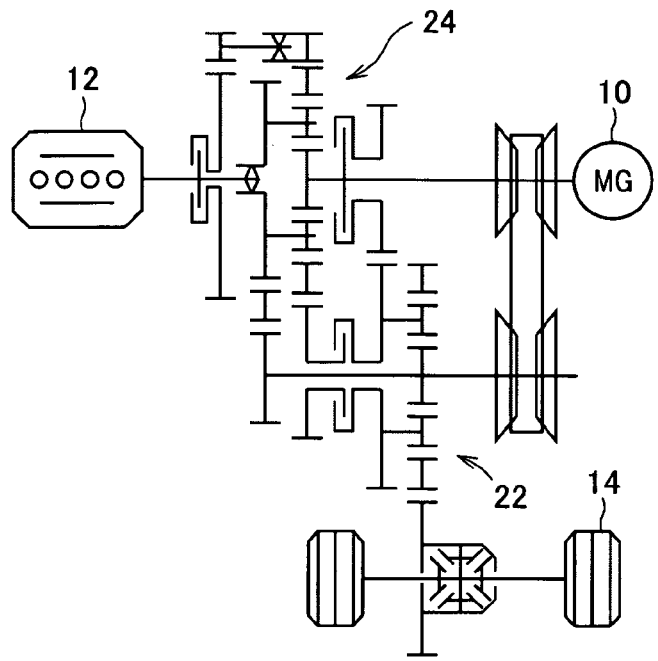
FIG. 14 is a skeleton view which illustrates a modification of a power transmission device which may be used in the first embodiment.

The structure of FIG. 12(d) is different in location of the input "IN" from that of FIG. 11. FIG. 14 is a skeleton view which illustrates a modification of the power transmission device 20 of FIG. 1 which uses the structure of FIG. 12(d). The structure of FIG. 13(b) has the CVT 30 disposed in a power transmission path connecting between the first and second planetary gear sets P1 and P2 and may be used with the one in FIG. 1(a). Specifically, the power transmission device 20 may be equipped with two CVTs: one disposed, like in FIG. 1(a), between the sun gear S of the second planetary gear set 24 and the motor-generator 10 and the other disposed, like in FIG. 13(b), disposed between the first and second planetary gear set 22 and 24.

Planetary Gear Set

The condition required to place the speed of the carrier C at zero (0) when speeds of the ring gear R and the sun gear S are not zero (0) is not necessarily limited to the condition in which the signs of speeds (i.e., the directions of rotation) of the ring gear R and the sun gear S are opposite each other. For example, the power transmission device 20 may alternatively be designed that when the signs of rotational speeds of the sun gear S and the ring gear R are identical with each other, the speed of the carrier C is zero (0). This is realized by, for example, a double pinion planetary gear set such as one disclosed in Japanese Patent First Publication No. 2001-108073.

Figure 15:
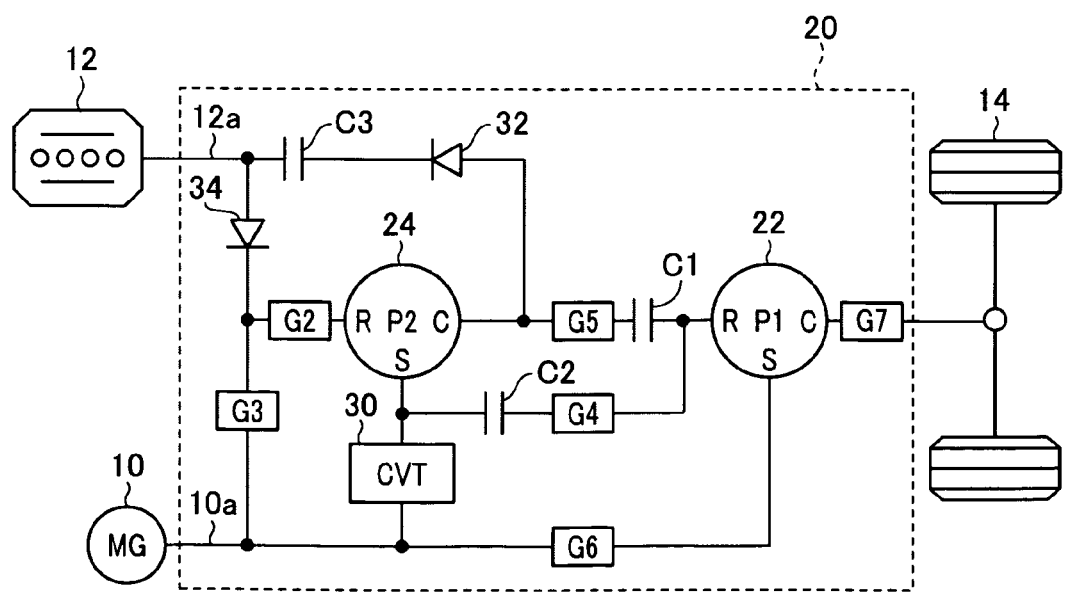
FIG. 15 is a block diagram which illustrates a modification of a power transmission device which uses a double pinion planetary gear set.

FIG. 15 illustrates an example in which the power transmission device 20 is equipped with the double pinion planetary gear set. The same reference numbers, as employed in the above embodiments, refer to the same or similar parts. The gears G2, G3, G4, G5, G6, and G7 are a counter gear, a forward gear, a counter gear, a forward gear (also called a normal rotation gear), a forward gear, and a counter gear, respectively. The illustrated structure is capable of achieving the geared neutral which places the speed of the carrier C of the second planetary gear set 24 at zero (0) and also establishing the CVT reversing operation upon switching from the first operation mode to the second operation mode.

Rotors of Power Transmission Device

The power transmission device 20 may alternatively be equipped with a set of three rotors such as a differential gear set working as power split rotors which are arrayed in speed thereof on a straight line in the nomographic chart instead of either or both of first and second sets of rotors (i.e., the first and second planetary gear sets 22 and 24).

Speed Variator (CVT 30)

Instead of the CVT 30 of a mechanical belt type, a traction drive type of continuously-variable transmission or a hydraulically-controlled continuously-variable transmission may be employed. A non continuously-variable transmission may also be used.

Engine Starting Operation

The engine 12 may alternatively be started in the first operation mode. For example, the controller 40 may start the engine 12 when the vehicle is stopped and then use the power to move the vehicle.

The controller 40 may also place the power transmission device 20 in an operation mode other than the first and second operation modes and then start the engine 12. For example, the controller 40 may disengage both the clutches C1 and C2 and then start the engine 12. This is achieved in the controller 40 by locking the driven wheels 14 through a brake when the vehicle is at a stop, engaging the clutch C3, and actuating the motor-generator 10 to supply the power from the motor-generator 10 to the rotating shaft 12a of the engine 12 through the second planetary gear set 24, the one-way bearing 32, and the clutch C3.

When it is required to start the engine 12, the controller 40 may supply the torque of the ring gear R of the second planetary gear set 24 to the rotating shaft 12a of the engine 12 after a difference in speed between the ring gear R and the rotating shaft 12a is placed below a given value. Such a condition, however, needs not necessarily be met. For instance, when the difference in speed between the ring gear R and the rotating shaft 12a is relatively great, the controller 40 may increase the degree of engagement of the clutch C3 gradually to create a partially engaged state thereof and then start to supply the torque from the ring gear R to the rotating shaft 12a of the engine 12.

Condition to Engage Clutch C3

When the speed of the engine 12 is below a minimum value needed to ensure the stability in operation of the engine 12, and an engine starting request is made, the controller 40 engages the clutch C3 in the above embodiments, but may alternatively make such engagement when it is required to brake the vehicle. This is enabled in the structure of the first and second embodiments designed to ensure the engine starting torque even when the motor-generator 10 is reduced in size. The reduction in size of the motor-generator 10 to a degree that generates up to several tens kW may result in a difficulty in increasing the braking force to be produced by a regenerative operation of the motor-generator 10 to a required level. However, the power transmission device 20 of the first or second embodiment is enabled to engage the clutch C3 and exert a resistive load from the engine 12 to the power transmission device 20 to produce engine braking.

First Torque Transmission Control Mechanism

The clutch C3 and the one-way bearing 32 work as a first torque transmission control mechanism to selectively block or establish transmission of torque between the rotating shaft 12a of the engine 12 and the engine starting rotor of the power transmission device 20 (i.e., the carrier C of the second planetary gear set 24) when it is required to start the engine 12. The first power transmission control mechanism may, however, be designed to include only the clutch C3. In this case, unwanted transmission of torque which will be increased suddenly upon start of combustion of fuel in the engine 12 to the power transmission device 20 is avoided by disengaging the clutch C3 prior to the start of combustion of fuel in the engine 12 after an initial rotation is given to the rotating shaft 12a of the engine 12. The first torque transmission control mechanism may also be made by only the one-way bearing 32.

The clutch C3 may alternatively be joined to the output of the one-way bearing 32.

Instead of the one-way bearing 32 which establishes the transmission of torque to the engine 12 under the condition that the speed of the input of the one-way bearing 32 (i.e., the ring gear R of the second planetary gear set 24 serving as the engine starting rotor) is not lower than that of the output of the one-way bearing 32 (i.e., the rotating shaft 12a of the engine), a one-way clutch or another similar type one-way power transmission mechanism working to have the rotating shaft 12a follow the rotation of the engine starting rotor with or without any slip may be used.

The clutch C3 which selectively blocks the transmission of torque from the power transmission device 20 to the rotating shaft 12a to start the engine 12 is of a normally open type, but may be of a normally closed type.

Second Torque Transmission Control Mechanism

The one-way bearing 34 works as a second torque transmission control mechanism to selectively establish a mechanical connection between the engine 12 and a power transmission rotor of the power transmission device 20 (i.e., the sun gear S the second planetary gear set 24) to transmit torque from the engine 12 to the driven wheels 14 when it is required to run the driven wheels 14. The second power transmission control mechanism may, however, alternatively be made of a one-way clutch.

Instead of the one-way bearing 34 which establishes the transmission of torque from the engine 12 to the driven wheels 14 under the condition that the speed of the input of the one-way bearing 34 (i.e., the speed of the engine 20) is not lower than that of the output of the one-way bearing 34 (i.e., the speed of an input of the power transmission device 20), a one-way clutch or another similar type one-way power transmission mechanism which has an output follow rotation of an input thereof with or without any slip may be used.

Instead of the one-way power transmission mechanism, a clutch may be used. In this case, unwanted mechanical vibrations which will arise from engagement of the clutch and act on the power transmission device 20 is avoided by controlling the speed of the engine 12 or the speed of the power transmission rotor to bring speeds of an input and an output of the clutch into agreement with each other and then engaging the clutch.

Accessory Powered by Torque of Power Split Rotor

In addition to the compressor 50 of the air conditioner, the power transmission device 20 may be connected to supply power to a brake pump which produces hydraulic pressure for applying braking force to the driven wheels 14, a water pump for coolant of the engine 12, or a cooling fan for the engine 12.

Power Split Rotor Coupled to Accessory

One or ones of the power split rotors other than those, as illustrated in FIG. 9, may be coupled mechanically to the accessory (also called an auxiliary device) such as the compressor 50 installed in the vehicle. The accessory may be connected mechanically between the ring gear R of the second planetary gear set 24 and the clutch C1 in FIG. 9. This connection will result in the circulation of power in the second operation mode even at a time other than when the engine 12 is started, thus leading to a decrease in power transmission efficiency, but offering the advantages that the speed of the ring gear R is permitted to be adjusted to zero (0) or another value while the vehicle is running and that the power is permitted to be supplied to the accessory both in the first and second operation modes even when the vehicle is stopped.

Stopping or Towing Vehicle

Figure 18:
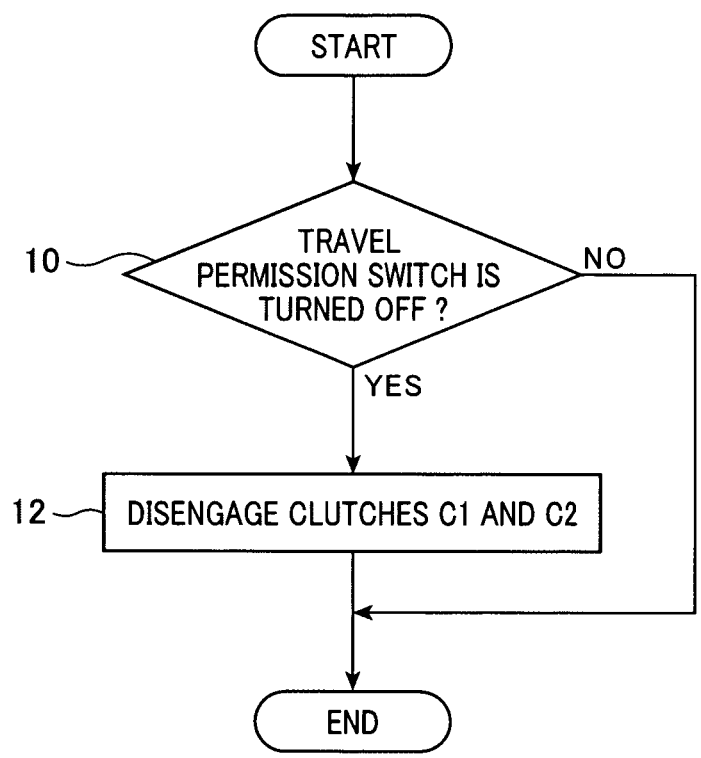
FIG. 18 is a flow chart of a program which may be executed by a power transmission device of the first embodiment when a vehicle is stopped.

When it is required to stop or tow the vehicle, the controller 40 preferably disengages the clutches C1 and C2. This avoids the rotation f the CVT 30 following the towing of the vehicle, thereby minimizing the deterioration of the CVT 30 even equipped with a metal belt. For example, in the structure of FIG. 1, when the controller 40 disengages both the clutches C1 and C2, it causes the generator-motor 10 to hold the CVT 30 from rotating, and permits the clutches C1 and C2 to idle. Basically, such an operation is achieved both in the first and second operation modes in the structure of the power transmission device 20 in which the CVT 30 is disposed in a looped path extending between the two power split rotors of the power transmission device 20, and the motor-generator 10 is joined mechanically to one of the ends of the CVT 30, FIG. 18 shows a sequence of logical steps which may be executed by the controller 40 of the first embodiment at a regular interval when the vehicle is stopped.

After entering the program, the routine proceeds to step 10 wherein it is determined whether a travel permission switch 95, as illustrated in FIG. 1, is turned off or not. The travel permission switch 95 is a switch to be turned on or off by a vehicle operator to permit the vehicle to travel. The travel permission switch 95 may be designed to be turned on or off in a wireless fashion when a portable wireless device carried by the vehicle operator is close to a vehicle controls system equipped with the controller 40. For example, when the travel permission switch 95 is turned on, the inverter 42 is connected electrically to a storage battery installed in the vehicle. If a YES answer is obtained meaning that the travel permission switch 95 is in the off-state, then the routine proceeds to step 12 wherein the controller 40 disengages the clutch C1 and C2. If a NO answer is obtained in step 10 or after step 12, the routine terminates.

Figure 19:
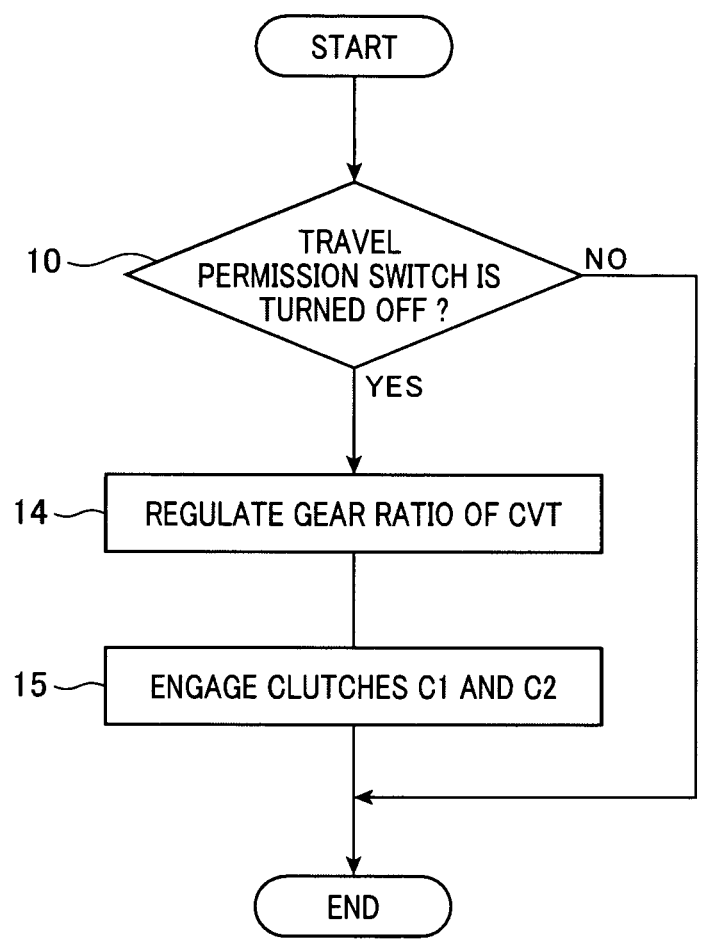
FIG. 19 is a flow chart of a modified program which may be executed by a power transmission device of the first embodiment when a vehicle is stopped.

The controller 40 may engage the clutch C1 and C2 and then set the total gear ratio of the power transmission device to a given high-speed gear ratio or alternatively change the gear ratio of the CVT 30 to have values different between the first and second operation modes and then engage the clutches C1 and C2, thereby locking the driven wheels 14. FIG. 19 shows a modification of a sequence of logical steps which may be executed by the controller 40 of the first embodiment at a regular interval when the vehicle is stopped. The same step numbers as employed in FIG. 18 refer to the same operations, and explanation thereof in detail will be omitted here.

If a YES answer is obtained in step 10 meaning that the travel permission switch 95 is turned off, then the routine proceeds to step 14 wherein the controller 40 regulates the gear ratio of the CVT 30 to set the total gear ratio to a given high-speed gear ratio or alternatively changes the gear ratio of the CVT 30 to have values different between the first and second operation modes. The routine then proceeds to step 16 wherein the controller 40 engages the clutches C1 and C2. If a NO answer is obtained in step 10 or after step 16, the routine terminates.

Other Modifications

The power transmission device 20 may be designed to allow the omission of transmission of torque to the driven wheels 14 upon switching between the first and second operation modes. This also offers the same advantage 1), as described in the first embodiment. Specifically, the controller 40 gradually increases the degree of engagement of one of the clutches C1 and G2 which is to be switched from the disengaged state to the engaged state to establish the partial engagement of the one of the clutches C1 and C2. However, when a fail-safe mode is entered in which it is required to switch between the first and second operation modes quickly regardless of mechanical stock arising therefrom, the controller 40 may switch between the first and second operation modes forcibly at a gear ratio of the CVT 30 which will develop values of the total gear ratio which are different between the first and second operation modes without creating the partial engagement of the one of the clutches C1 and C2.

Figure 16:
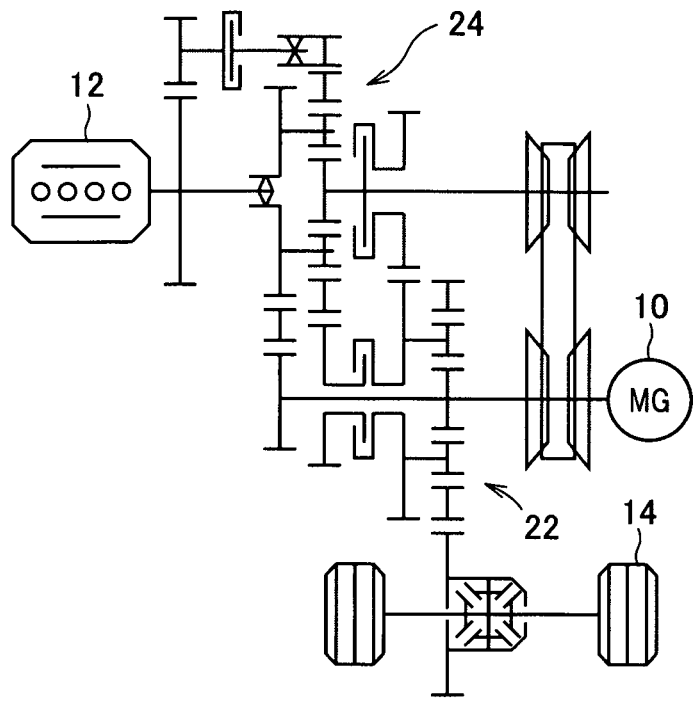
FIG. 16 is a block diagram which illustrates a modification of a power transmission device which may be used in a structure of each of the first, second, and third embodiments.

The power transmission device 20 may have the structure, as illustrated in FIG. 16. Specifically, a gear or a gear box is disposed between the clutch C3 and the rotating shaft 12a of the engine 12, thereby permitting the clutch C3 to be reduced in size.

The controller 40 does not necessarily need to place the power transmission device 20 in the second operation mode.

An automotive vehicle in which the power transmission device 20 is to be installed may be an engine-powered vehicle equipped with only the engine 12 or an electric vehicle equipped with only the motor-generator 10 as well as the hybrid vehicle, as described above, equipped with both the engine 12 and the motor-generator 10. The automotive vehicle may also be equipped with a plurality of electric rotating machines for use in running the driven wheels 14. The electric rotating machines may be all or partly implemented by motor-generators. For example, some of the electric rotating machines may be used only as electric motors, while some of the electric rotating machines may be used only as electric generators which also work to charge a high-voltage battery installed in the vehicle to supply electric power to the electric motors.

Total Gear Ratio

Figure 17:
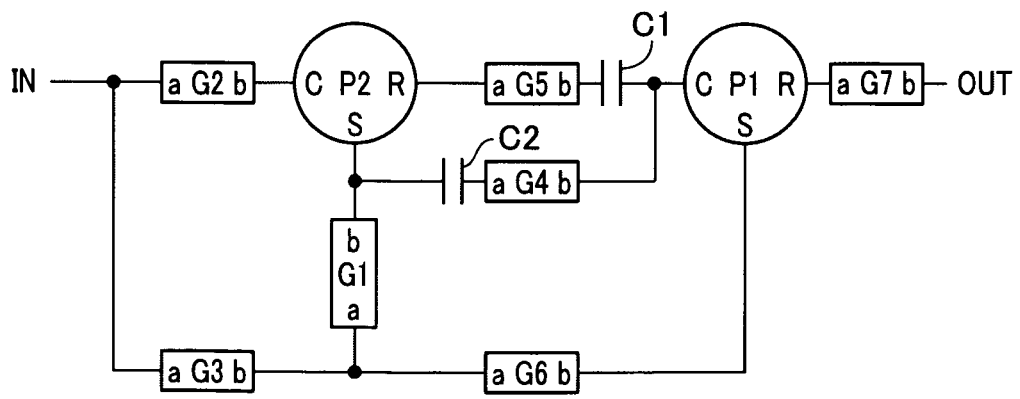
FIG. 17 is a view which shows an equivalent structure of a power transmission device of FIG. 1(a) for explaining how to determine a total gear ratio.

The total gear ratio in the power transmission device 20 of the first embodiment may be determined using an equivalent structure, as illustrated in FIG. 17. The illustrated structure has gears G1, G2, G3, G4, G5, G6, and G7. The gear G1 corresponds to the CVT 30. The structure of the first embodiment is different from the one in FIG. 17 in the gears G2 and G6. If the gear ratios r2 and r5 of the gears G2 and G6 are both selected to be one (1), the structure of FIG. 17 will be the same as in the first embodiment. Each of the gears G2 to G7 is a speed variator mechanism which converts an input speed into an output speed at a fixed rate and is made of a single gear or a set of a plurality of gears which may also be equipped with a chain or a belt.

The gear ratio m of the gear Gn (n=1 to 7) is defined herein as a ratio of speed b to speed a. Note that each of "a" and "b" in each block of FIG. 17 indicates one of an input and an output of each gear. The number of teeth of the sun gear S/the number of teeth of the ring gear R of the first planetary gear P1 is defined as a gear ratio ρ1. The number of teeth of the sun gear S/the number of teeth of the ring gear R of the second planetary gear P2 is defined as a gear ratio ρ2. The rotational speeds of the sun gear S, the ring gear R, and the carrier C of the first planetary gear set P1 are defined as wS1, wR1, and wC1, respectively. The rotational speeds of the sun gear S, the ring gear R, and the carrier C of the second planetary gear set P2 are defined as wS2, wR2, and wC2, respectively. The speed of an input "IN" of a power transmission path to which the output of the engine 12 or the motor-generator 10 is inputted is defined as wIN. "OUT" indicates an output of the power transmission path from which the power is transmitted to the driven wheels 14. Equations (c3) and (c4) are met.

$$P1 wS1 - (1+\rho1) wC1 + wR1 = 0 \tag{c3}$$

$$P2 wS2 - (1+\rho2) wC2 + wR2 = 0 \tag{c4}$$

1 Total Gear Ratio in First Operation Mode

In the first operation mode, the speed wS2 of the sun gear S and the speed wC2 of the carrier C of the second planetary gear set P2 are given by the following relations.

$$wC2 = r2 \cdot wIN \tag{c5}$$

$$wS2 = r3 \cdot r1 \cdot wIN \tag{c6}$$

Therefore, the speed wR2 of the ring gear R of the second planetary gear set P2 is $$wR2 = \{(1+\rho2) \cdot r2 - \rho2 \cdot r1 \cdot r3\} wIN \tag{c7}$$

Eliminating the speeds wS1, wC1, and wR1 from Eq. (c3) using Eq. (c7), we obtain $$\rho1 \cdot r6 \cdot r3 \cdot wIN - (1+\rho1) \cdot r5 \cdot \{(1+\rho2) \cdot r2 - \rho2 \cdot r1 \cdot r3\} wIN + wR2 = 0 \tag{c8}$$

Accordingly, the total gear ratio in the first operation mode is $$\text{Total gear ratio} = -r7 [\rho1 \cdot r6 \cdot r3 - (1+\rho1) \cdot r5 \cdot \{(1+\rho2) \cdot r2 - \rho2 \cdot r1 \cdot r3\}] \tag{c9}$$

2 Total Gear Ratio in Second Operation Mode

Considering a power transmission path extending through the gears G3, G1, and G4 and a power transmission path extending through the gears G3 and G6 in Eq. (3c), we obtain $$\rho1 \cdot r3 \cdot r6 \cdot wIN - (1+\rho1) \cdot r3 \cdot r1 \cdot r4 \cdot wIN + wR2 = 0 \tag{c10}$$

Therefore, the total gear ratio in the second operation mode is $$\text{Total gear ratio} = -r7 \{\rho1 \cdot r3 \cdot r6 - (1+\rho1) \cdot r3 \cdot r1 \cdot r4\} \tag{c11}$$

Mode Switching Condition without Omission of Transmission of Torque

No omission of transmission of torque is achieved under condition where the total gear ratios in the first and second operation modes are identical with each other. This condition is expressed by $$-r7[\rho1 \cdot r6 \cdot r3 - (1+\rho1) \cdot r5 \cdot \{(1+\rho2) \cdot r2 - \rho2 \cdot r1 \cdot r3\}] = -r7\{\rho1 \cdot r3 \cdot r6 - (1+\rho1) \cdot r3 \cdot r1 \cdot r4\}$$

Rewriting the above equation, we obtain $$r1 = \{r2 \cdot r5 \cdot (\rho2+1)\} / \{r3 \cdot (r5+\rho2+r4)\} \tag{c12}$$

The switching between the first and second operation modes with no omission of transmission of torque to the driven wheels 14 is therefore, achieved by selecting the gear ratio r1 of the CVT 30 (i.e., the gear G1) to have the value in the right side of Eq. (c12).

CVT Reversing Operation

The CVT reversing operation is achieved under condition that the product of values derived by differentiating a function in which the total gear ratio is expressed by a dependent variable, and the gear ratio r1 is expressed by an independent variable with respect to the gear ratio r1 in the first operation mode and in the second operation mode is negative.

Using Eqs. (c9) and (c11), the above condition is given by $$\{-(1+\rho1) \cdot r7 \cdot r5 \cdot \rho2 \cdot r3\} \cdot \{r7 \cdot (1+\rho1) \cdot r3 \cdot r4\} < 0$$

Rewriting the above relation, we obtain $$-r5 \cdot r4 < 0 \tag{c13}$$

In the structure of the first embodiment, r4<0 and r5<0.

The total gear ratio in the structure of FIG. 11 may also be determined in the same manner as described above.

Infinite Torque in First Operation Mode

The following discussion will refer to the structure in FIG. 17 for sake of simplicity.

If a ratio of the number Zs of teeth of the sun gear S to the number Zr of teeth of the ring gear R (i.e., Zs/Zr) of the first planetary gear set 22 is defined as ρ1, and torques of the ring gear R, the sun gear S, the carrier C of the first planetary gear set 22 are defined as Tr1, Ts1, and Tc1, respectively, the following equations (c14) and (c15) are met.

$$Ts1 = \rho1 \cdot Tr1 \tag{c14}$$

$$Tc1 = -(1+\rho1) \cdot Tr1 \tag{c15}$$

The gear Gn has an input Gna and an output Gnb. If torques of the input Gna and the output Gab are defined as Tna and Tnb (n=1 to 7), respectively, the following equation is satisfied.

$$T5a = -r5 \cdot T5b = r5 \cdot Tc1 = -r5 \cdot (1+\rho1) \cdot Tr1 \tag{c16}$$

$$T6a = -r6 \cdot T6b = r6 \cdot Ts1 = r6 \cdot \rho1 \cdot Tr1 \tag{c17}$$

If a ratio of the number Zs of teeth of the sun gear S to the number Zr of teeth of the ring gear R (i.e., Zs/Zr) of the second planetary gear set 24 is defined as ρ2, and torques of the ring gear R, the sun gear S, the carrier C of the second planetary gear set 24 are defined as Tr2, Ts2, and Tc2, respectively, the following equations (c18) and (c19) are met from Eqs. (c1) and (c2).

$$Ts2 = \rho2 \cdot Tr2 \tag{c18}$$

$$Tc2 = -(1+\rho2) \cdot Tr2 \tag{c19}$$

The torque Tr2 is given by the following equation.

$$Tr2 = -T5a = r5 \cdot T5b = -r5 \cdot T1c = r5 \cdot (1+\rho1) \cdot Tr1 \tag{c20}$$

Therefore, the following relation is met.

$$\begin{aligned} T1a &= -r1 \cdot T1b \\ &= r1 \cdot Ts2 \\ &= r1 \cdot \rho2 \cdot Tr2 \\ &= r1 \cdot \rho2 \cdot r5 \cdot (1+\rho1) \cdot Tr1 \end{aligned} \tag{c21}$$

$$\begin{aligned} T2a &= -r2 \cdot T2b \\ &= r2 \cdot Tc2 \\ &= -r2 \cdot (1+\rho2) \cdot Tr2 \\ &= -r2 \cdot r5 \cdot (1+\rho2) \cdot (1+\rho1) \cdot Tr1 \end{aligned} \tag{c22}$$

From Eqs. (c17) and (c20), the following relation is met.

$$\begin{aligned} T3b &= -(T1a + T6a) \\ &= -\{r1 \cdot \rho2 \cdot r5 \cdot (1+\rho1) + r6 \cdot \rho1\} \cdot Tr1 \end{aligned} \tag{c23}$$

An input torque TIN that is torque transmitted to the input "IN" in FIG. 17 is given by the following equation (c24).

$$TIN = -(T3a + T2a) \tag{c24}$$

$$\begin{aligned} &= -(-r3 \cdot Tb3 + T2a) \\ &= -\{r3 \cdot r1 \cdot \rho2 \cdot r5 \cdot (1+\rho) + r3 \cdot r6 \cdot \\ &\quad \rho1 - r2 \cdot r5 \cdot (1+\rho2) \cdot (1+\rho1)\} \cdot Tr1 \end{aligned}$$

Eq. (c24) shows that torque Tr1 will have an extremely great value relative to the finite input torque TIN when the gear ratio r1 is regulated to bring the coefficient of Tr1 (i.e., the first term on the right side of Eq. (c24) close to zero (0). The structure of the first embodiment has the motor-generator 10 connecting between the gear G3 and the CVT 30, so that the speed of the motor-generator 10 is converted by the gear ratio r3. The gear ratio r2 is, thus, expressed by the product of r3 and r2 in the structure of the first embodiment. The torque of the driven wheels 14 (i.e., torque Tr1) in the structure of the first embodiment can, thus, be increased greatly by setting the gear ratio r3 to one (1) and selecting the gear ratio r1 (i.e., the gear ratio of the CVT 30).

Energy Reversal in First Operation Mode

The following discussion will refer to the structure in FIG. 17 for sake of simplicity.

As long as the rotational speed of the input "IN" does not change, the signs of speeds (i.e., directions of rotation) of the sun gear S and the carrier C of the second planetary gear set 24 remain unchanged. The fact that the speed of the input "IN" does not change, but the direction of flow of rotational energy is reversed at the gear G3 is equivalent to the fact that the sign of torque of the gear G3 is reversed. From Eq. (c23), a condition required to reverse the sign of torque of the gear G3 by selecting the gear ratio r1 is that signs of the coefficient including the gear ratio r1 (i.e., the first term on the right side of Eq. c23) and a constant term (i.e. the second term on the right side of Eq. (c23)) are opposite each other since Eq. (c23) is a linear function of the gear ratio r1, and the gear ratio r2>0, In other words, the above required condition is to meet the following equation (c25).

$$\{\rho2 \cdot r5 \cdot (1+\rho1)\} \cdot \{r6 \cdot \rho1\} < 0 \tag{c25}$$

Since, in the first embodiment, the gear r5<0, and the gear r6=1, Eq. (c25) is satisfied. The condition, as expressed by Eq. (c25), shows that the gear G6 is indispensable, in other words, the bypass power transmission path mechanically connecting the sun gear S and the carrier C of the second planetary gear set 24 together is required to have a branch path connecting with the first planetary gear set 22. Specifically, since Eq. (c23) is a linear function of the gear ratio r1, the value of the gear ratio r1 (i.e., equation (c26) below) when the torque T3 is zero (0) is preferably required to lie within an adjustable gear ratio range in which the gear ratio r1 is allowed to be changed by controlling the CVT 30.

$$r1 = (-1) \cdot (r6 \cdot \rho1)/\{\rho2 \cdot r5 \cdot (1+\rho1)\} \tag{c26}$$

When the gear ratio r1 is at the middle of the adjustable gear ratio range, the reversal of the sign of rotational energy of the gear G3 is achieved by regulating an absolute value of the gear ratio of each gear (or each gear box) in Eq. (26). However, in the above embodiments, the gear ratio r1 satisfying Eq. (c26) is required to fall within a forward travel range of the vehicle.

When it is required to decrease the rotational energy in the bypass power transmission path below that of the input "IN" by reversing the sign of the rotational energy in the bypass power transmission path, the power split rotor (i.e., the sun gear S in FIG. 1(a)) of the second planetary gear set P2 which is joined to a T-shaped path without through the branch path, as described above, connecting with the power source is positive in power thereof. The T-shaped path is a path that makes a junction between the branch path connecting with the first planetary gear set P1 and the bypass power transmission path.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A power transmission apparatus for a vehicle comprising:
   a first rotor set including a first, a second, and a third rotor which are so linked mechanically and
   a second rotor set including a first, a second, and a third rotor which are so linked mechanically,
   wherein the first and second rotor sets work as a power split device to transmit rotational energy, as produced by a power source, to a driven wheel of a vehicle,
   wherein the first rotor of the first rotor set is connected mechanically to the driven wheel, and the second rotor of the first rotor set is mechanically connectable to the first rotor of the second rotor set, and
   wherein the second second rotor set is capable of placing the second and third rotors thereof to have signs of power which are different from each other,
   wherein a mechanism is provided which works to mechanically connect the first rotor set and the second rotor set and includes a speed variator which convert a speed of rotation of an input thereof into a speed of rotation of an output thereof at a variable output-to-input speed ratio,
   wherein the power source is mechanically connected to at least one of the second rotor and the third rotor of the second rotor set,
   wherein the second and third rotors of the second rotor set are so linked as to have signs of power which are different from each other, and when a speed of the power source is being kept at the same sign, the speed variator is capable of changing the output-to-input speed ratio thereof so that the second and third rotors of the first rotor set have signs of power which are different from each other, and
   wherein when the second and third rotors of the first rotor set are different in signs of power from each other, the speed variator is capable of placing a sign of speed of rotation of the first rotor of the first rotor set to be either positive or negative depending upon a value of the output-to-input speed ratio thereof.

2. A power transmission apparatus as set forth in claim 1, wherein the second rotor of the first rotor set and the first rotor of the second rotor set are coupled mechanically together not through the first and third rotor of the first rotor set and the second and third rotor of the second rotor set, wherein the second rotor set is joined mechanically to the power source, and wherein the power split device has an operation mode in which the rotational energy, as produced by the power source, is transmitted to the first rotor of the second rotor set only through the second and third rotors of the second rotor set.

3. A power transmission apparatus as set forth in claim 1, further comprising a connecting mechanism which is disposed outside the second rotor set and connects between the second and third rotors of the second rotor set mechanically.

4. A power transmission apparatus as set forth in claim 3, wherein the second and third rotors of the second rotor set are connected mechanically through a bypass power transmission path in which the connecting mechanism is disposed, and further comprising a speed variator which is disposed in the bypass power transmission path and works to convert a speed of rotation of an input thereof into a speed of rotation of an output thereof at a variable output-to-input speed ratio.

5. A power transmission apparatus as set forth in claim 3, further comprising a first branch path and a second branch path which are connected mechanically to the connecting mechanism, the first branch path leading to the power source, the second branch path extending to the first rotor set.

6. A power transmission apparatus as set forth in claim 5, further comprising a speed variator which connects two of the first to third rotors of the first and second rotor sets, the speed variator working to convert a speed of rotation of an input thereof into a speed of rotation of an output thereof at a variable output-to-input speed ratio, wherein the second and third rotors of the second rotor set are connected mechanically through a bypass power transmission path, and wherein a direction of flow of rotational energy in a portion of the bypass power transmission path is enabled to be reversed within a variable range in which the output-to-input speed ratio of the speed variator is permitted to be changed.

7. A power transmission apparatus as set forth in claim 1, further comprising a speed variator which connects two of the first to third rotors of the first and second rotor sets, the speed variator working to convert a speed of rotation of an input thereof into a speed of rotation of an output thereof at a variable output-to-input speed ratio.

8. A power transmission apparatus as set forth in claim 1, wherein two of the first, second, and third rotors of the first rotor set are mechanically connectable to two of the first, second, and third rotor of the second rotor set.

9. A power transmission apparatus as set forth in claim 1, further comprising a first switching mechanism and a second switching mechanism, the first switching mechanism being placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set, the second switching mechanism being placed selectively in one of an engaged state establishing a mechanical connection between the second rotor of the first rotor set and one of the second rotor and the third rotor of the second rotor set and a disengaged state blocking the mechanical connection between the second rotor of the first rotor set and the one of the second rotor and the third rotor of the second rotor set.

10. A power transmission apparatus as set forth in claim 9, further comprising a speed variator which is disposed in at least one of a power transmission path mechanically connecting the power source and the second rotor set together and a power transmission path mechanically connecting the first rotor set and the second rotor set together and works to convert a speed of rotation of an input thereof into a speed of rotation of an output thereof at a variable output-to-input speed ratio, wherein when the first switching mechanism is placed in the engaged state, and the second switching mechanism is in the disengaged state, a first operation mode is entered, while when the first switching mechanism is placed in the disengaged state, and the second switching mechanism is in the engaged state, a second operation mode is entered, wherein a power transmission path is provided between the power source and the driven wheel, and the speed variator is so designed that a speed of rotation in the power transmission path between the power source and the driven wheel at a total output-to-input speed ratio thereof depending upon a change in output-to-input speed ratio of the speed variator in the first operation mode is opposite in sign to that in the second operation mode.

11. A power transmission apparatus as set forth in claim 10, further comprising a mode-switching speed variator which is disposed in at least one of a first power transmission path which is established in the first operation mode and extends between the first rotor of the second rotor set and the second rotor of the first rotor set and a second power transmission path which is established in the second operation mode and extends between one of the second rotor and the third rotor of the second rotor set and the second rotor of the first rotor set, the mode-switching speed variator serving to compensate for a difference in speed between the first rotor of the second rotor set and the second rotor of the first rotor set or between the one of the second rotor and the third rotor of the second rotor set and the second rotor of the first rotor set which occurs upon switching between the first and second operation modes.

12. A power transmission apparatus as set forth in claim 1, wherein the power source includes an electric rotating machine and an internal combustion engine, further comprising a torque transmission control mechanism which selectively establishes and blocks transmission of power between the first rotor of the second rotor set and the internal combustion engine.

13. A power transmission apparatus as set forth in claim 12, wherein the torque transmission control mechanism includes an electronically-controlled breaker which blocks the transmission of power between the first rotor of the second rotor set and the internal combustion engine.

14. A power transmission apparatus as set forth in claim 13, wherein the torque transmission control mechanism also includes a one-way power transmission mechanism which establishes the transmission of power between the first rotor of the second rotor set and the internal combustion engine under condition that a speed of an input of the one-way power transmission mechanism leading to the first rotor is higher than or equal to that of an output of the one-way power transmission mechanism leading to the internal combustion engine.

15. A power transmission apparatus as set forth in claim 12, further comprising a second torque transmission control mechanism which selectively establishes and blocks transmission of power between one of the first to third rotor of the second rotor set other than the first rotor and the internal combustion engine.

16. A power transmission apparatus as set forth in claim 1, wherein each of the first, second, and third rotors of each of the first and second rotor sets is one of a sun gear, a carrier, and a ring gear of a planetary gear set.

17. A power transmission control system for a vehicle comprising:
a first rotor set including a first, a second, and a third rotor which are so linked mechanically as to have rotational speeds;
a second rotor set including a first, a second, and a third rotor which are so linked mechanically as to have rotational speeds;
a first and a second switching mechanism; and
a controller,
wherein the first and second rotor sets work as a power split device to transmit rotational energy, as produced by a power source, to a driven wheel of a vehicle, wherein the first rotor of the first rotor set is connected mechanically to the driven wheel, and the second rotor of the first rotor set is mechanically connectable to the first rotor of the second rotor set,
wherein the second rotor set is capable of placing the second and third rotors thereof to have signs of power which are different from each other,
wherein the first switching mechanism is placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set, and the second switching mechanism is placed selectively in one of an engaged state establishing a mechanical connection between the second rotor of the first rotor set and the second rotor of the second rotor set and a disengaged state blocking the mechanical connection between the second rotor of the first rotor set and the second rotor of the second rotor set, and
wherein the controller places both the first and second switching mechanisms in the disengaged states thereof when a travel permission switch for the vehicle is in an off-state.

18. A power transmission control system for a vehicle comprising:
a first rotor set including a first, a second, and a third rotor which are so linked mechanically as to have rotational speeds;
a second rotor set including a first, a second, and a third rotor which are so linked mechanically as to have rotational speeds;
a first and a second switching mechanism;
a speed variator which is disposed in at least one of a power transmission path mechanically connecting the power source and the second rotor set and a power transmission path mechanically connecting the first rotor set and the second rotor set and works to convert a speed of rotation of an input thereof into a speed of rotation of an output thereof at a variable output-to-input speed ratio; and
a controller,
wherein the first and second rotor sets work as a power split device to transmit rotational energy, as produced by a power source, to a driven wheel of a vehicle,
wherein the first rotor of the first rotor set is connected mechanically to the driven wheel, and the second rotor of the first rotor set is mechanically connectable to the first rotor of the second rotor set,
wherein the second rotor set is capable of placing the second and third rotors thereof to have signs of power which are different from each other,
wherein the first switching mechanism is placed selectively in one of an engaged state establishing a mechanical connection between the second rotor of the first rotor set and the first rotor of the second rotor set and a disengaged state blocking the mechanical connection between the second rotor of the first rotor set and the first rotor of the second rotor set, and the second switching mechanism is placed selectively in one of an engaged state establishing a mechanical connection between the second rotor of the first rotor set and the second rotor of the second rotor set and a disengaged state blocking the mechanical connection between the second rotor of the first rotor set and the second rotor of the second rotor set, and wherein when the first switching mechanism is placed in the engaged state, and the second switching mechanism is in the disengaged state, a first operation mode is entered, while when the first switching mechanism is placed in the disengaged state, and the second switching mechanism is in the engaged state, a second operation mode is entered, wherein a power transmission path is provided between the power source and the driven wheel, and the speed variator is so designed that a speed of rotation in the power transmission path between the power source and the driven wheel at a total output-to-input speed ratio thereof depending upon a change in output-to-input speed ratio of the speed variator in the first operation mode is opposite in sign to that in the second operation mode, and wherein the controller controls the output-to-input speed ratio of the speed variator so that the total output-to-input speed ratio to have values different between the first and second operation modes and then places both the first and second switching mechanisms in the engaged states thereof when a travel permission switch for the vehicle is turned off.

* * * * *